(12) United States Patent
Alvandi-Tabrizi et al.

(10) Patent No.: US 12,544,727 B2
(45) Date of Patent: Feb. 10, 2026

(54) PROCESS CHAMBER WITH SIDE SUPPORT

(71) Applicant: ASM IP HOLDING B.V., Almere (NL)

(72) Inventors: Youness Alvandi-Tabrizi, Tempe, AZ (US); John DiSanto, Scottsdale, AZ (US); Shiva K.T. Rajavelu Muralidhar, Tempe, AZ (US)

(73) Assignee: ASM IP Holding B.V., Almere (NL)

( * ) Notice: Subject to any disclaimer, the term of this patent is extended or adjusted under 35 U.S.C. 154(b) by 526 days.

(21) Appl. No.: 17/154,851

(22) Filed: Jan. 21, 2021

(65) Prior Publication Data

US 2021/0229056 A1    Jul. 29, 2021

Related U.S. Application Data

(60) Provisional application No. 62/965,717, filed on Jan. 24, 2020.

(51) Int. Cl.
*B01J 8/06* (2006.01)
*H10P 72/00* (2026.01)

(52) U.S. Cl.
CPC ........ *B01J 8/06* (2013.01); *B01J 2208/00884* (2013.01); *B01J 2208/06* (2013.01); *H10P 72/0462* (2026.01)

(58) Field of Classification Search
CPC ........... H01L 21/6719; C23C 16/45502; C23C 16/45504
See application file for complete search history.

(56) References Cited

U.S. PATENT DOCUMENTS

| 3,560,166 A | 2/1971 | Walles |
| 3,598,082 A | 8/1971 | Rice |
| 3,627,590 A | 12/1971 | Mammel |
| 3,744,964 A | 7/1973 | Hart |

(Continued)

FOREIGN PATENT DOCUMENTS

| JP | S57-198620 | 12/1982 |
| JP | S59-112614 | 6/1984 |

(Continued)

OTHER PUBLICATIONS

Benchmark, "The ASM-Epitaxy Newsletter of Continuous Improvement", Fall 1999.

(Continued)

*Primary Examiner* — Parviz Hassanzadeh
*Assistant Examiner* — Nathan K Ford
(74) *Attorney, Agent, or Firm* — Banner & Witcoff, Ltd.

(57) ABSTRACT

A process chamber can include a curved upper wall extending longitudinally from a first end portion of the reaction chamber to a second end portion of the reaction chamber. The process chamber can include a curved lower wall cooperating with the curved upper wall to at least partially define an internal cavity, the curved lower wall connected to the curved upper wall from the first end portion to the second end portion at a first side of the process chamber and at a second side of the process chamber. A rail can extend along an exterior surface of the process chamber from the first end portion to the second end portion, the rail disposed at or near a connection between the curved upper wall and the curved lower wall.

25 Claims, 17 Drawing Sheets

(56) References Cited

U.S. PATENT DOCUMENTS

| | | |
|---|---|---|
| 3,830,194 A | 8/1974 | Benzing et al. |
| 3,956,860 A | 5/1976 | Andrews |
| 4,076,859 A | 2/1978 | Schladitz |
| 4,108,108 A | 8/1978 | Schladitz |
| 4,188,519 A | 2/1980 | Berg |
| 4,496,609 A | 1/1985 | McNeilly et al. |
| 4,512,283 A | 4/1985 | Bonifield et al. |
| 4,533,820 A | 8/1985 | Shimizu |
| 4,539,933 A | 9/1985 | Campbell et al. |
| 4,545,327 A | 10/1985 | Campbell et al. |
| 4,558,660 A | 12/1985 | Nishizawa et al. |
| 4,590,024 A | 5/1986 | Lesk et al. |
| 4,630,669 A | 12/1986 | Kessler et al. |
| 4,654,509 A | 3/1987 | Robinson et al. |
| 4,770,630 A | 9/1988 | Akimoto et al. |
| 4,803,948 A | 2/1989 | Nakagawa et al. |
| 4,807,562 A | 2/1989 | Sandys |
| 4,821,674 A | 4/1989 | deBoer et al. |
| 4,834,022 A | 5/1989 | Mahawili |
| 4,836,138 A | 6/1989 | Robinson et al. |
| 4,839,145 A | 6/1989 | Gale et al. |
| 4,854,263 A | 8/1989 | Chang et al. |
| 4,886,449 A | 12/1989 | Brittin |
| 4,920,918 A | 5/1990 | Adams et al. |
| 4,920,920 A | 5/1990 | Shigeki |
| 4,924,807 A | 5/1990 | Nakayama et al. |
| 4,950,918 A | 8/1990 | O'Breartuin |
| 4,958,061 A | 9/1990 | Wakabayashi et al. |
| 4,980,204 A | 12/1990 | Fujii |
| 4,991,540 A | 2/1991 | Jurgensen et al. |
| 4,992,303 A | 2/1991 | Whiffin et al. |
| 4,993,360 A | 2/1991 | Nakamura |
| 4,994,301 A | 2/1991 | Kusumoto et al. |
| 5,024,182 A | 6/1991 | Kobayashi et al. |
| 5,038,395 A | 8/1991 | Lenski |
| 5,062,386 A | 11/1991 | Christensen |
| 5,070,814 A | 12/1991 | Whiffin et al. |
| 5,077,875 A | 1/1992 | Hoke et al. |
| 5,085,887 A | 2/1992 | Adams et al. |
| 5,091,217 A | 2/1992 | Monkowski et al. |
| 5,092,728 A | 3/1992 | Crabb et al. |
| 5,096,534 A | 3/1992 | Ozias |
| 5,108,792 A | 4/1992 | Anderson et al. |
| 5,179,677 A | 1/1993 | Anderson et al. |
| 5,194,401 A | 3/1993 | Adams et al. |
| 5,228,917 A | 7/1993 | Pawlakowitsch et al. |
| 5,244,694 A | 9/1993 | Ozias |
| 5,328,722 A | 7/1994 | Ghanayem et al. |
| 5,336,327 A | 8/1994 | Lee |
| 5,348,587 A | 9/1994 | Eichman et al. |
| 5,370,738 A | 12/1994 | Watanabe |
| 5,411,590 A | 5/1995 | Hawkins et al. |
| 5,421,893 A | 6/1995 | Perlov |
| 5,421,957 A | 6/1995 | Carlson et al. |
| 5,455,069 A | 10/1995 | Lee |
| 5,532,457 A | 7/1996 | Cobb et al. |
| 5,551,982 A | 9/1996 | Anderson |
| 5,685,906 A | 11/1997 | Dietze |
| 5,695,567 A | 12/1997 | Kordina et al. |
| 5,792,273 A | 8/1998 | Ries et al. |
| 6,076,482 A | 6/2000 | Ding et al. |
| 6,093,252 A | 7/2000 | Wengert et al. |
| 6,132,553 A * | 10/2000 | Ikeda ............... H01L 21/67011 |
| | | 118/724 |
| 6,143,079 A | 11/2000 | Halpin |
| 6,159,297 A | 12/2000 | Herchen et al. |
| 6,245,149 B1 | 6/2001 | de Lomenie et al. |
| 6,290,806 B1 | 9/2001 | Donohoe |
| 6,383,330 B1 | 5/2002 | Raaijmakers |
| 6,465,761 B2 | 10/2002 | Stevens et al. |
| 6,540,837 B2 | 4/2003 | Raaijmakers |
| 6,545,863 B2 | 4/2003 | Huggin |
| 6,608,287 B2 | 8/2003 | Halpin et al. |
| 7,108,753 B2 | 9/2006 | Wood |
| 7,169,233 B2 | 1/2007 | Wood |
| 2002/0007797 A1* | 1/2002 | Stevens ............... C23C 16/481 |
| | | 118/724 |
| 2002/0033232 A1* | 3/2002 | Raaijmakers ......... C23C 16/481 |
| | | 118/723 R |
| 2005/0092242 A1* | 5/2005 | Wood ................... C23C 16/481 |
| | | 118/715 |
| 2005/0109275 A1 | 5/2005 | Wood |
| 2018/0363139 A1* | 12/2018 | Rajavelu ............... C23C 16/46 |

FOREIGN PATENT DOCUMENTS

| | | |
|---|---|---|
| JP | S59-223294 | 12/1984 |
| JP | S60-161616 | 8/1985 |
| JP | H02-299225 A | 12/1990 |
| JP | H10-335252 A | 12/1998 |
| JP | H11-510562 A | 9/1999 |

OTHER PUBLICATIONS

May 27, 2025—(JP) Decision to Grant—Appl No. 2021-007874, Eng Tran.

* cited by examiner

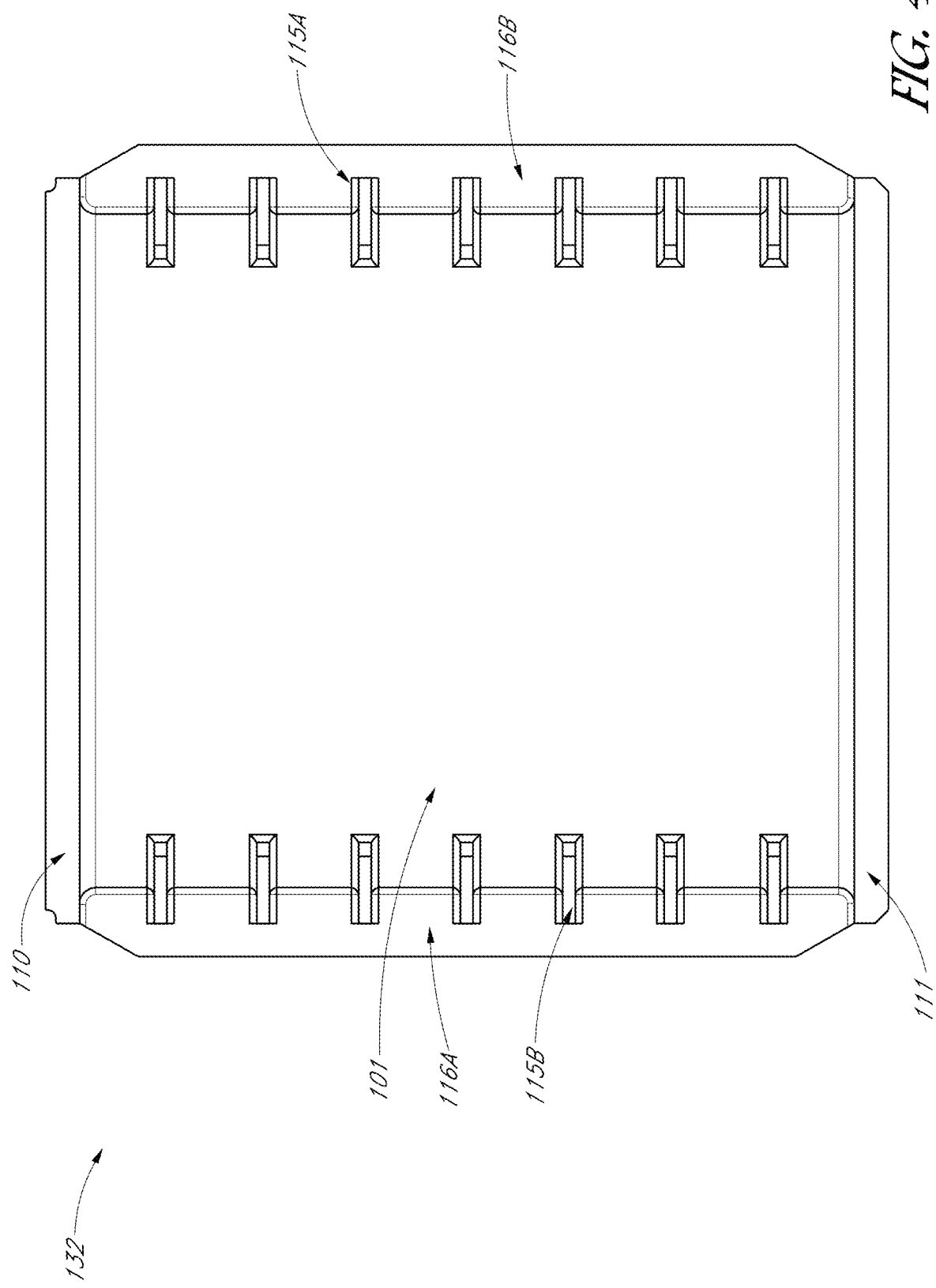

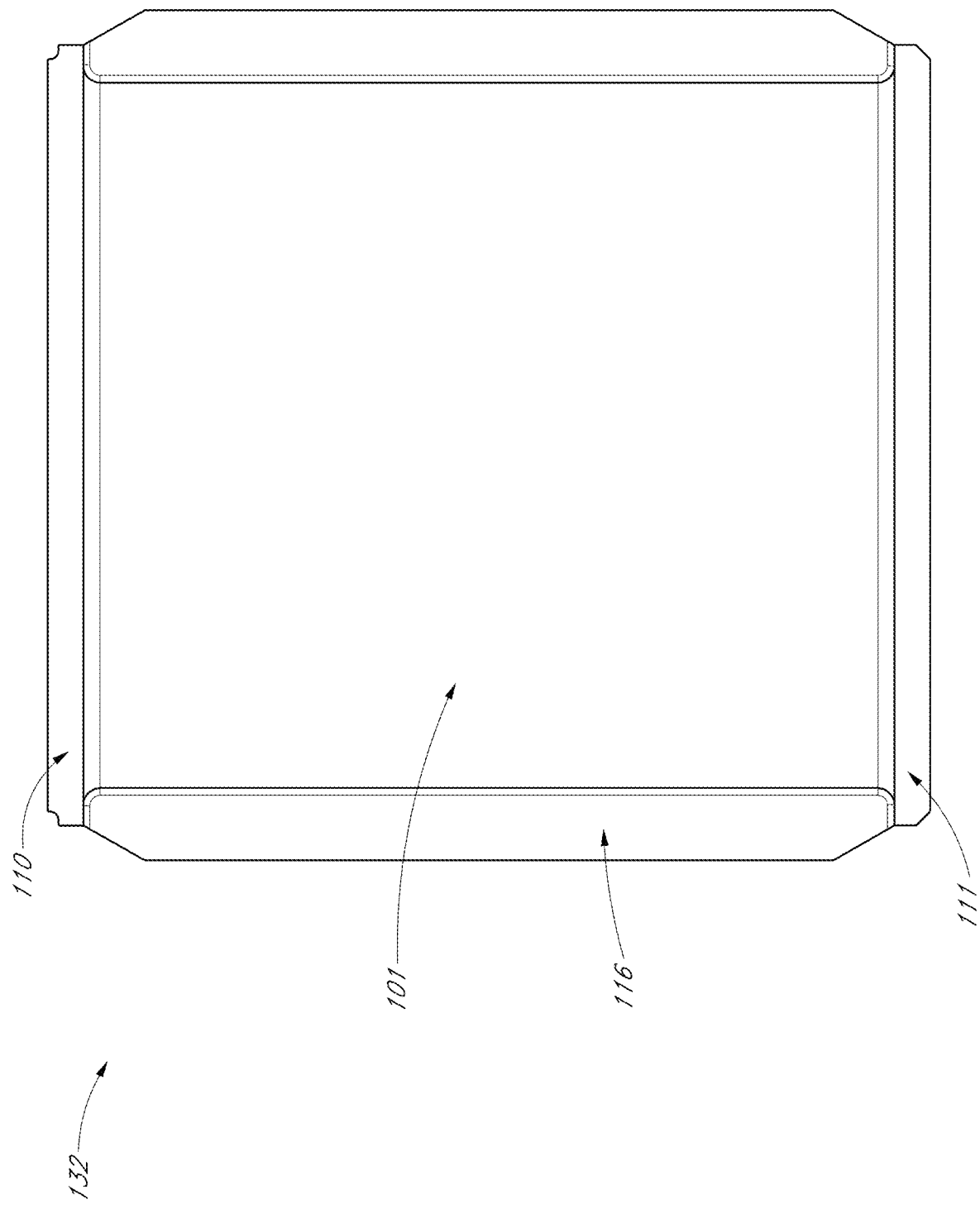

PROCESS CHAMBER WITH SIDE SUPPORT

CROSS-REFERENCE TO RELATED APPLICATIONS

This application claims priority to U.S. Provisional Patent Application No. 62/965,717, filed Jan. 24, 2020, the entire contents of which are hereby incorporated by reference herein in their entirety and for all purposes.

BACKGROUND

Field of the Disclosure

This disclosure relates generally to semiconductor processing chambers with side supports, and, more particularly, to the use of ribs on exterior surfaces of a process chamber to enhance the structural integrity of the process chamber.

Description of the Related Art

Process or reaction chambers for processing semiconductor wafers typically are made of quartz (Vitreous silica) or similar material because quartz is substantially transparent to radiant energy. Radiant heaters may be positioned adjacent the exterior of the chamber, and a wafer being processed in the chamber can be heated to elevated temperatures without having the chamber walls heated to the same level. Furthermore, quartz is desirable because it can withstand very high temperatures, and its inert characteristics enable it to withstand degradation by various processing gases.

When positioning a flat wafer for chemical vapor deposition purposes where the deposition gases flow parallel to the wafer, it may be desirable that the chamber wall be parallel to the flat surface of the wafer, to obtain uniform deposition on the wafer surface. However, for applications in which the pressure within a quartz chamber is to be reduced much lower than the surrounding ambient pressure, rounded chambers often are preferred from a strength standpoint because their curved surfaces can best withstand the inwardly directed force. A flat wall may collapse inwardly with reduced interior pressure sooner than will an outwardly convex wall of similar size and thickness.

Accordingly, there remains a continuing need for improved mechanical support for reaction chambers.

SUMMARY

In one embodiment, a process chamber can include a curved upper wall extending longitudinally from a first end portion of the reaction chamber to a second end portion of the reaction chamber; a curved lower wall cooperating with the curved upper wall to at least partially define an internal cavity, the curved lower wall connected to the curved upper wall from the first end portion to the second end portion at a first side of the reaction chamber and at a second side of the reaction chamber; and a rail extending along an exterior surface of the process chamber from the first end portion to the second end portion, the rail disposed at or near a connection between the curved upper wall and the curved lower wall.

In another embodiment, a process chamber can include a curved upper wall extending longitudinally from a first end portion of the reaction chamber to a second end portion of the reaction chamber; a curved lower wall cooperating with the curved upper wall to at least partially define an internal cavity, the curved lower wall connected to the curved upper wall from the first end portion to the second end portion at a first side of the reaction chamber and at a second side of the reaction chamber; and a first plurality of first rib support structures disposed along only a portion of the curved upper wall and along only a portion of the curved lower wall at or near a connection between the curved upper wall and the curved lower wall.

In some embodiments, at least one of the curved upper wall and curved lower wall comprises a circular, elliptical, or polynomial shape. In some embodiments, at least one of the curved upper wall and curved lower wall comprises a substantially uniform thickness. In some embodiments, the curved upper wall and curved lower wall are welded together. In some embodiments, the curved upper wall and curved lower wall are connected through a connector. In some embodiments, the connector is E-shaped. In some embodiments, the connector includes a top portion, a bottom portion, and an intermediate portion. In some embodiments, the intermediate portion is connected to a horizontal shelf. In some embodiments, the connector is curved. In some embodiments, the process chamber is made out of a material that is substantially transparent to radiant energy. In some embodiments, the process chamber is made out of quartz. In some embodiments, the side ribs are directly welded onto the curved upper wall and curved lower wall. In some embodiments, the plurality of side ribs do not contact the curved top wall and curved bottom wall. In some embodiments, the process chamber includes at least one flange in contact with the curved upper wall and curved lower wall at the first end portion and the second end portion. In some embodiments, the at least one flange is configured to connect with an input manifold or an output manifold. In some embodiments, the at least one flange comprises a first flange configured to connect with an input manifold and a second flange configured to connect with an output manifold. In some embodiments, the process chamber includes at least one rail connected to the plurality of side ribs. In some embodiments, the at least one rail extends along the first interface or the second interface. In some embodiments, the at least one rail connects to at least one of the curved upper wall and the curved lower wall. In some embodiments, the at least one rail is welded to at least one of the curved upper wall and the curved lower wall. In some embodiments, the plurality of side ribs comprises a top plurality of rib support structures located on the top of the at least one rail and a bottom plurality of rib support structures located on the bottom of the rail. In some embodiments, the at least one rail comprises a first rail and a second rail, and wherein the plurality of rib support structures comprises a first plurality of rib support structures connected to the first rail and a second plurality of rib support structures connected to the second rail. In some embodiments, the plurality of rib support structures are spaced evenly apart across the first interface or second interface. In some embodiments, the plurality of rib support structures comprises a first plurality of side rib support structures located on the first interface and a second plurality of rib support structures located on the second interface.

In another embodiment, a reaction chamber can include a curved upper wall extending longitudinally from a first end portion of the reaction chamber to a second end portion of the reaction chamber; a curved lower wall cooperating with the curved upper wall to at least partially define an internal cavity, wherein the curved lower wall is connected to the curved upper wall from the first end portion to the second end portion at a first side of the reaction chamber and at a second side of the reaction chamber; and a first rib support structure disposed on the first side of the reaction chamber at or near a connection between the curved upper wall and the curved lower wall, the first rib support structure having a first curved top portion secured to a curved exterior surface of the curved upper wall along only a portion of the curved upper wall and a first curved bottom portion secured to a curved exterior surface of the curved lower wall along only a portion of the curved lower wall.

In some embodiments, the curved lower wall is mechanically connected to the curved upper wall by way of an intervening connector. In some embodiments, the intervening connector is an E-shaped connector. In some embodiments, the process chamber includes a second rib support structure disposed on the second side of the reaction chamber across the second interface, the second rib support structure having a second curved top portion secured to the curved upper wall and a second curved bottom portion secured to the curved lower wall. In some embodiments, the process chamber includes a plurality of first rib support structures disposed on the first side of the reaction chamber and spaced apart longitudinally from one another, each first rib support structure of the plurality of first rib support structures having a first curved top portion secured to the curved exterior surface of the curved upper wall and a first curved bottom portion secured to the curved exterior surface of the curved lower wall. In some embodiments, the process chamber includes a plurality of second rib support structures disposed on the second side of the reaction chamber and spaced apart longitudinally from one another, each second rib support structure of the plurality of second rib support structures having a second curved top portion secured to the curved exterior surface of the curved upper wall and a second curved bottom portion secured to the curved exterior surface of the curved lower wall. In some embodiments, the process chamber includes a first rail extending along and mechanically secured to the first interface on an exterior surface of the reaction chamber outside the interior cavity. In some embodiments, the first curved top portion of each first rib support structure is disposed above the first rail, and wherein the first curved bottom portion of each first rib support structure is disposed below the first rail. In some embodiments, the first curved top portion of each first rib support structure is welded to an upper surface of the first rail, and wherein the first curved bottom portion of each first rib support structure is welded to a lower surface of the first rail. In some embodiments, the first curved top portion and the first curved bottom portion are integrally formed together. In some embodiments, the first curved top portion comprises a curved surface shaped to conform to the exterior surface of the curved upper wall, and wherein the first curved bottom portion comprises a curved surface shaped to conform to the exterior surface of the curved lower wall. In some embodiments, the first curved top portion and the first curved bottom portion cooperate to define a generally C-shaped profile. In some embodiments, the curved upper wall is welded to the curved lower wall. In some embodiments, the curved upper wall and the curved lower wall comprise quartz. In some embodiments, the process chamber includes a horizontal shelf disposed in the interior cavity and configured to support a substrate.

In another embodiment, a process chamber can include a curved upper wall extending longitudinally from a first end portion of the reaction chamber to a second end portion of the reaction chamber; and a curved lower wall cooperating with the curved upper wall to at least partially define an internal cavity, an upper end of the curved lower wall connected by way of a joint to a lower end of the curved upper wall from the first end portion to the second end portion at a first side of the reaction chamber and at a second side of the reaction chamber, wherein a first maximum thickness of the joint is within 20% of a second maximum thickness of at least one of the lower end of the curved upper wall and the upper end of the curved lower wall.

In some embodiments, the joint comprises an E-shaped connector welded to the curved upper and lower walls. In some embodiments, the joint comprises a linear or curvilinear base with three mechanical connection points extending from a first end, a second end, and an interior portion of the base. In some embodiments, the joint comprises a welded connection between the curved upper wall and the curved lower wall. In some embodiments, the first maximum thickness is substantially the same as the second maximum thickness. In some embodiments, the joint comprises a vertical sidewall extending linearly between the upper end and the lower end, the vertical sidewall welded to the upper and lower ends. In some embodiments, the process chamber includes a first plurality of first rib support structures disposed along only a portion of the curved upper wall and along only a portion of the curved lower wall at or near the joint.

BRIEF DESCRIPTION OF THE DRAWINGS

These and other features, aspects and advantages of the present invention will now be described with reference to the drawings of several embodiments, which embodiments are intended to illustrate and not to limit the invention.

FIG. 3b is a schematic side view of the curved process chamber of FIG. 3a.

FIG. 3c is a schematic top view of the curved process chamber of FIG. 3a.

FIG. 3d is a rear schematic perspective cross-sectional view of the curved process chamber of FIG. 3a.

FIG. 3e is a schematic front view of the curved process chamber of FIG. 3a.

FIG. 4b is a schematic side view of the curved process chamber of FIG. 4a.

FIG. 4c is a schematic top view of the curved process chamber of FIG. 4a.

FIG. 5b is a schematic side view of the curved process chamber of FIG. 5a.

FIG. 5c is a schematic top view of the curved process chamber of FIG. 5a.

DETAILED DESCRIPTION

Figure 1:
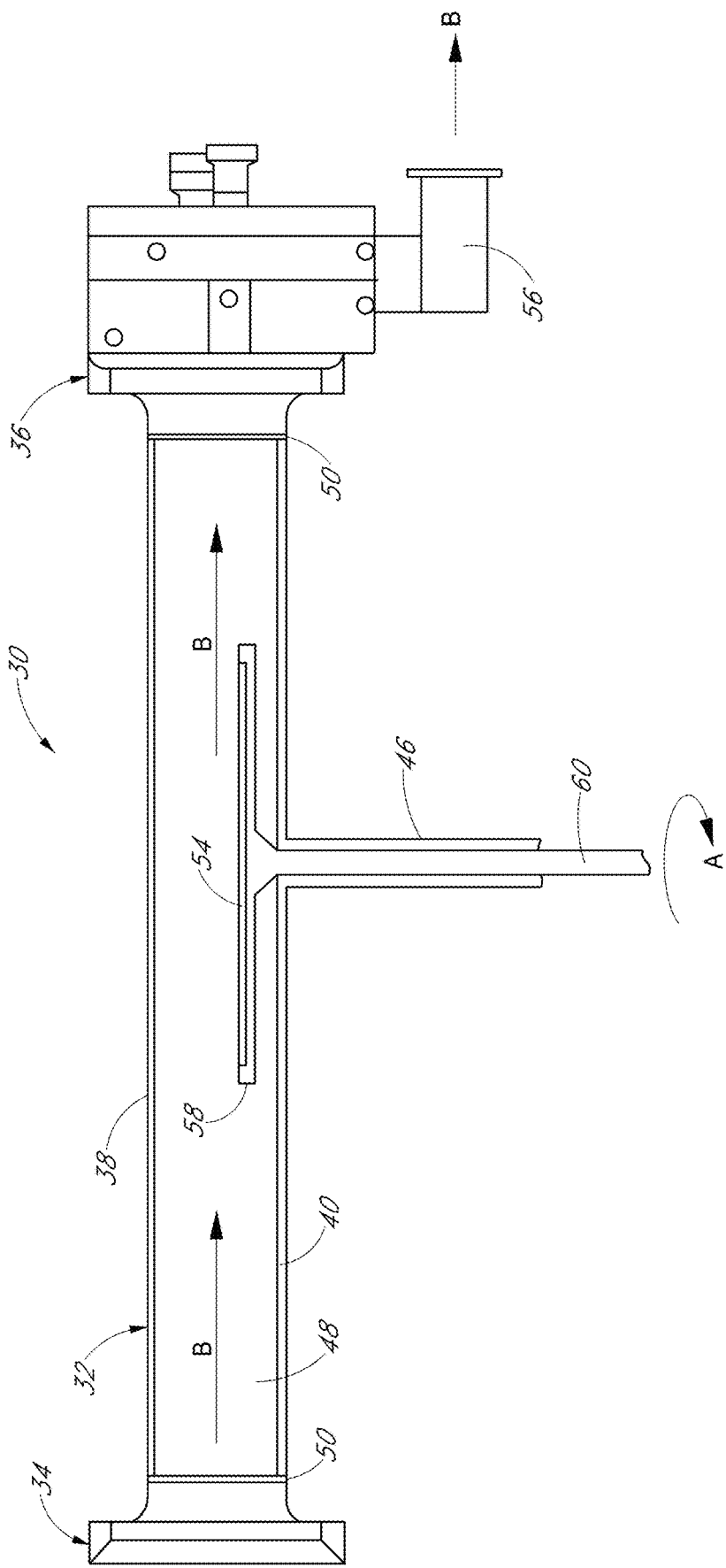
FIG. 1 illustrates a cross sectional view of a wafer processing system.

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

Various embodiments disclosed herein provide structural support for reaction chambers (such as horizontal reaction chambers) in a manner that ensures uniform or even heat distribution. In various embodiments disclosed herein, for example, a reaction chamber (which can be formed of quartz in some embodiments) can be defined by mechanically connecting a curved upper wall to a curved lower wall. Ribs can be provided along sides of the reaction chamber for mechanical support. In some arrangements, ribs may extend above or below the process chamber to provide structural support. For example, in some arrangements, ribs can extend around an entirety of the reaction chamber. However, one disadvantage of such a design is that even though quartz is substantially transparent to the radiant lamp energy, thick ribs may present a region of much thicker quartz, and thus the ribs locally absorb more lamp energy and attenuate the lamp energy delivered to the wafer. This attenuation of energy causes cooler regions (e.g., shadows) on the wafer. Such non-uniformity of temperature on the wafer surface reduces the quality of the films that may be grown thereon, particularly for process conditions that are temperature-sensitive.

Further, providing ribs on the top of the process chamber may be difficult to consistently manufacture which increases variability and manufacturing costs to building the process chambers. For rectangular process chambers, the process chamber may utilize ribs that not only reside on the side of the chamber but also on the top and bottom of the chamber in order to maintain structural stability due to inherently weak design based on a flat top wall and flat bottom wall. A curved process chamber with a curved top wall and curved bottom wall beneficially provides a stronger structure in which the ribs can be disposed only on the sides of the chamber and not on the curved top wall and curved bottom wall, while maintaining structural integrity. Therefore, a curved process chamber with ribs only on the sides of the chamber provides proper structural integrity and improves thermal uniformity during processing.

Further, some embodiments disclosed herein enable improved welded connections, for example, by connecting upper and lower curved walls to one another that have substantially the same thickness as an intervening connector. Some process chambers may have side rails that have a thickness different from the top wall and the bottom wall. However, welding together materials with different thicknesses may create a poor welded joint. Accordingly, in various embodiments, the curved process chamber can include a curved top wall and a curved bottom wall with intervening connectors between the curved top wall and curved bottom wall. The intervening connectors between the curved top wall and curved bottom wall can have substantially the same thickness where the walls meet in order to create better welds. Further, in some embodiments, the curved top wall and the curved bottom wall can meet at first and second interfaces, which may comprise a connector. In other embodiments, the top and bottom walls can directly contact one another. The curved top wall and curved bottom wall can have substantially the same thickness at the interface portion in order to create better welds.

These solutions will be demonstrated in various embodiments disclosed in the drawings.

FIG. 1 illustrates a cross sectional view of a wafer processing system as can be seen in FIG. 2B of U.S. Pat. No. 8,067,061 issued on Nov. 29, 2011, titled REACTION APPARATUS HAVING MULTIPLE ADJUSTABLE EXHAUST PORTS, the entire contents of which are hereby incorporated by reference and made part of this specification. This wafer processing system includes a reaction apparatus 30 having a process chamber 32 mounted to an input manifold 34 and an output manifold 36 through contact points 50. The wafer process chamber (also referred to herein as a reaction chamber) can include a wafer holder 54 which can be a susceptor which is mounted on a rotational stand 60. The reaction apparatus 30 includes the reaction chamber 32, an inlet manifold 34, and an outlet manifold 36. The reaction chamber 32 includes an upper wall 38, a lower wall 40, a first side wall (not shown), a second side wall (not shown) opposite the first side wall, and a hollow tube 46 extending downwardly from the lower wall 40, thereby forming an enclosed reaction space 48 therewithin. In an embodiment, the reaction chamber 32 is formed of transparent quartz.

The inlet manifold 34 can be configured for introducing reactant gases into the reaction space 48. The outlet manifold 36 is operatively attached to the reaction chamber 32 for withdrawing excess reactant gases as well as the by-products of the reaction between the reactant gases and a substrate or wafer 54 within the reaction space 48. Excess reactant gases and by-products can be collectively referred to as effluent gases that exit the chamber at the end of the reaction chamber 32. In an embodiment, the reaction chamber 32 includes a single outlet aperture (not shown) that communicates with the outlet manifold 36. The excess reactant gases and by-products are transferred from the outlet aperture of the reaction chamber 32 through the outlet manifold 36 to an exhaust system (not shown) by way of a single outlet port 56. In other embodiments, multiple outlet apertures and outlet ports can be provided.

The substrate or wafer 54 is supported by a substrate support in the form of a susceptor 58 within the reaction space 48 of the reaction chamber 32, as shown in FIG. 1. The susceptor 58 is operatively supported by a susceptor support that is connected to a shaft 60 distending downwardly, and the shaft 60 is received within the hollow tube 46 of the reaction chamber 32. The susceptor 58 is configured to receive a substrate 54 from a load lock housing such that the substrate 54 is positioned centrally upon the upper surface of the susceptor 58. The shaft 60 of the susceptor 58 is operatively connected to a motor (not shown) that selectively rotates the shaft 60 and susceptor 58. Rotation of the susceptor 58 results in corresponding rotation of the substrate 54 supported thereon.

In operation, a substrate 54 is transferred onto the susceptor 58 within the reaction space 48 of the reaction chamber 32. Once the substrate 54 is positively located on the susceptor 58, the motor (not shown) causes the susceptor 58 and substrate 54 to rotate within the reaction chamber 32. As the substrate 54 is rotated, reactant gases are introduced into the reaction space 48 by way of the inlet manifold 34. The reactant gases flow in a substantially linear manner from the inlet manifold 34, across the upper surface of the substrate 54, through the outlet manifold 36, and exits through the outlet port 56. The flow of the reactant gases within the reaction chamber 32 is illustrated by arrow B in FIG. 1. While the present description is directed to deposition of thin films on a substrate, one skilled in the art should understand that even distribution of gases over a substrate surface in other processes such as etching, annealing, doping, oxidizing, or any other process may also be desired. The process chambers disclosed in FIGS. 2-7b may be used in the systems disclosed in FIG. 1 and in U.S. Pat. No. 8,067,061, which is incorporated by reference herein in its entirety and for all purposes.

Figure 2:
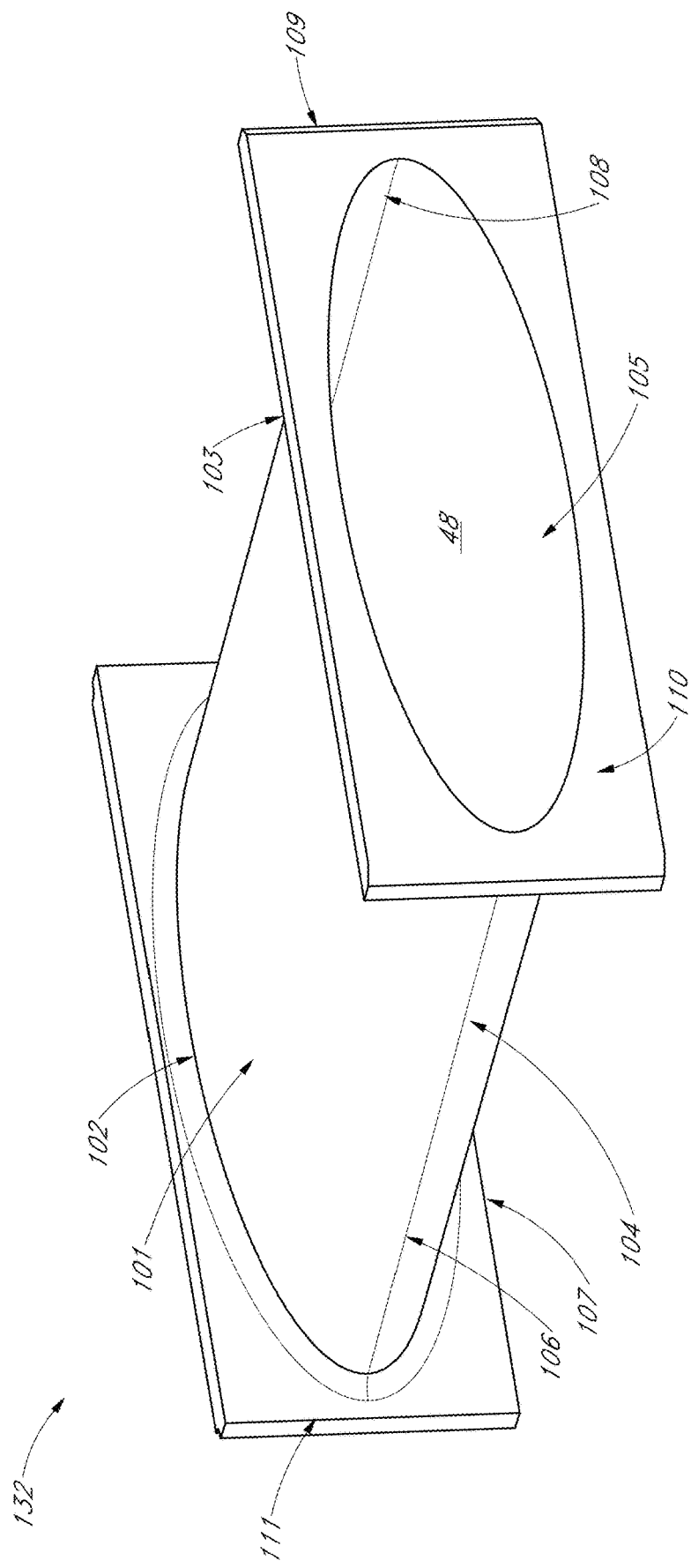
FIG. 2 illustrates a perspective view of a curved process chamber, according to various embodiments.

FIG. 2 illustrates a perspective view of a curved process chamber 132, according to various embodiments. The curved process chamber 132 can include a curved upper wall 101 extending longitudinally from a first end portion 102 of the reaction chamber to a second end portion 103 of the process chamber 132. The curved process chamber can include a curved lower wall 104 cooperating with the curved upper wall 101 to at least partially define an internal cavity 105 that can serve as the reaction space 48, wherein the curved lower wall 104 is connected to the curved upper wall 101, for example, by way of a connector disposed along interfaces between the walls in some embodiments. In some embodiments, the curved lower wall 104 can connect directly (e.g., without a connector) to the curved upper wall 101 from the first end portion 102 to the second end portion 103 along a first interface 106 at a first side 107 of the reaction chamber and along a second interface 108 at a second side 109 of the process chamber 132. Thus, in various embodiments, the upper and lower walls 101, 104 can directly connect to one another along the interfaces 106, 108 without a connector therebetween. In other embodiments, the upper and lower walls 101, 104 can connect to one another along the interfaces 106, 108 by way of an intervening connector. The curved upper wall 101 can have a substantially same thickness as the curved lower wall 104 at the first interface 106 and the second interface 108.

In some embodiments, the curved lower wall 104 can be mechanically connected to the curved upper wall 101 through a connector. In some embodiments, the connector can comprise an E-shaped connector. In some embodiments, the curved upper wall 101 and curved lower wall 104 can comprise a circular, elliptical, or polynomial shape. In some embodiments, the curved upper wall 101 and curved lower wall 104 can comprise a substantially uniform thickness. In some embodiments, a rail can extend along an exterior surface of the process chamber 132 from the first end portion 102 to the second end portion 103, with the rail being disposed at or near a connection between the curved upper wall 101 and the curved lower wall 104. In some embodiments, where the rail meets the curved upper wall 101 and curved lower wall 104, the thickness of the rail is substantially the same as the curved upper wall 101 and the curved lower wall 104 to create better welds. In some embodiments, the curved lower wall 104 can be mechanically connected to the curved upper wall 101 with a connector. In some embodiments, the curved lower wall 104 and the curved upper wall 101 can be welded together. In some embodiments the process chamber 132 can be made out of a material that is substantially transparent to radiant energy, such as quartz.

The radius of curvature of the curved upper wall 101 and the curved lower wall 104 may be relatively low in order to achieve proper structural integrity while improving manufacturability. As discussed above, a flat shape can also improve gas flow and therefore a low radius of curvature can improve gas flow, which can in turn improve uniformity of deposition.

As shown in FIG. 2, two flanges (e.g., a front flange 110 and a rear flange 111) can be configured to mate with the input manifold 34 and the output manifold 36, respectively. (See FIG. 1). The flanges 110, 111 can be in contact with the curved upper wall 101 and the curved lower wall 104 at the first end portion 102 and the second end portion 103.

FIGS. 3a-3e illustrate various views of the curved process chamber 132 of FIG. 2 with rib support structures 115A, 115B. The embodiment of FIGS. 3a-3e shares all the features of the embodiment of FIG. 2 and these features are not be described again in connection with FIGS. 3a-3e. FIGS. 3a-3e shows a first plurality of first rib support structures 115A disposed on the curved upper wall 101 and curved lower wall 104 at only the portion of the curved upper wall 101 and curved lower wall 104 near the connection between the curved upper wall 101 and the curved lower wall 104 (e.g., near the interface 106). A plurality of second rib support structures 115B can be disposed on the curved upper wall 101 and curved lower wall 104 at only the portion of the curved upper wall 101 and curved lower wall 104 near the connection between the curved upper wall 101 and the curved lower wall 104 (e.g., near the interface 108). The first rib support structures 115A can be disposed on the first side 107 of the chamber 132, and the second rib support structures 115B can be disposed on the second side 109 of the chamber 132 opposite the first side 107.

In some embodiments, the rib support structures 115A, 115B can be directly welded onto at least one of the curved upper wall 101, curved lower wall 104, and the connector (e.g., along the interfaces 106, 108). In some embodiments, the rib support structures 115A, 115B do not overlap with the top portion and bottom portion of the process chamber 132 and therefore do not provide uneven heating. The plurality of rib support structures 115A, 115B can be spaced evenly apart across the curved upper wall 101 and the curved lower wall 104. The plurality of rib support structures can comprise a first plurality of rib support structures 115A and a second plurality of rib support structures 115B which are disposed on opposite sides running along the connector or interfaces 106, 108.

In some embodiments, the reaction chamber 132 can include a first rib support structure 115A disposed on the first side 107 of the reaction chamber 132 across the connector or interface 108, the first rib support structure 115A having a first curved top portion 112 secured to a curved exterior surface of the curved upper wall 101 and a first curved bottom portion 113 secured to a curved exterior surface of the curved lower wall 104. The reaction chamber 132 can further include a second rib support structure 115B disposed on the second side 109 of the reaction chamber 132 across an opposite connector, the second rib support structure 115B having a second curved top portion 112 secured to the curved upper wall 101 and a second curved bottom portion 113 secured to the curved lower wall 104. Thus, the reaction chamber 132 can include a plurality of first rib support structures 115a disposed on the first side 107 of the reaction chamber 132 and spaced apart longitudinally from one another, each first rib support structure 115A of the plurality of first rib support structures having a first curved top portion 112 secured to the curved exterior surface of the curved upper wall 101 and a first curved bottom portion 113 secured to the curved exterior surface of the curved lower wall 103. Thus, the reaction chamber 132 can also include a plurality of second rib support structures 115B disposed on the second side 109 of the reaction chamber 132 and spaced apart longitudinally from one another, each second rib support structure 115B of the plurality of second rib support structures having a second curved top portion 112 secured to the curved exterior surface of the curved upper wall 101 and a second curved bottom portion 113 secured to the curved exterior surface of the curved lower wall 104.

The rib support structures 115A, 115B can provide both structural support to the process chamber 132 as well as act as cooling fins. A skilled artisan would appreciate that the minimum number of rib support structures to provide proper structural support can be used in order to improve manufacturability.

Figure 3A:
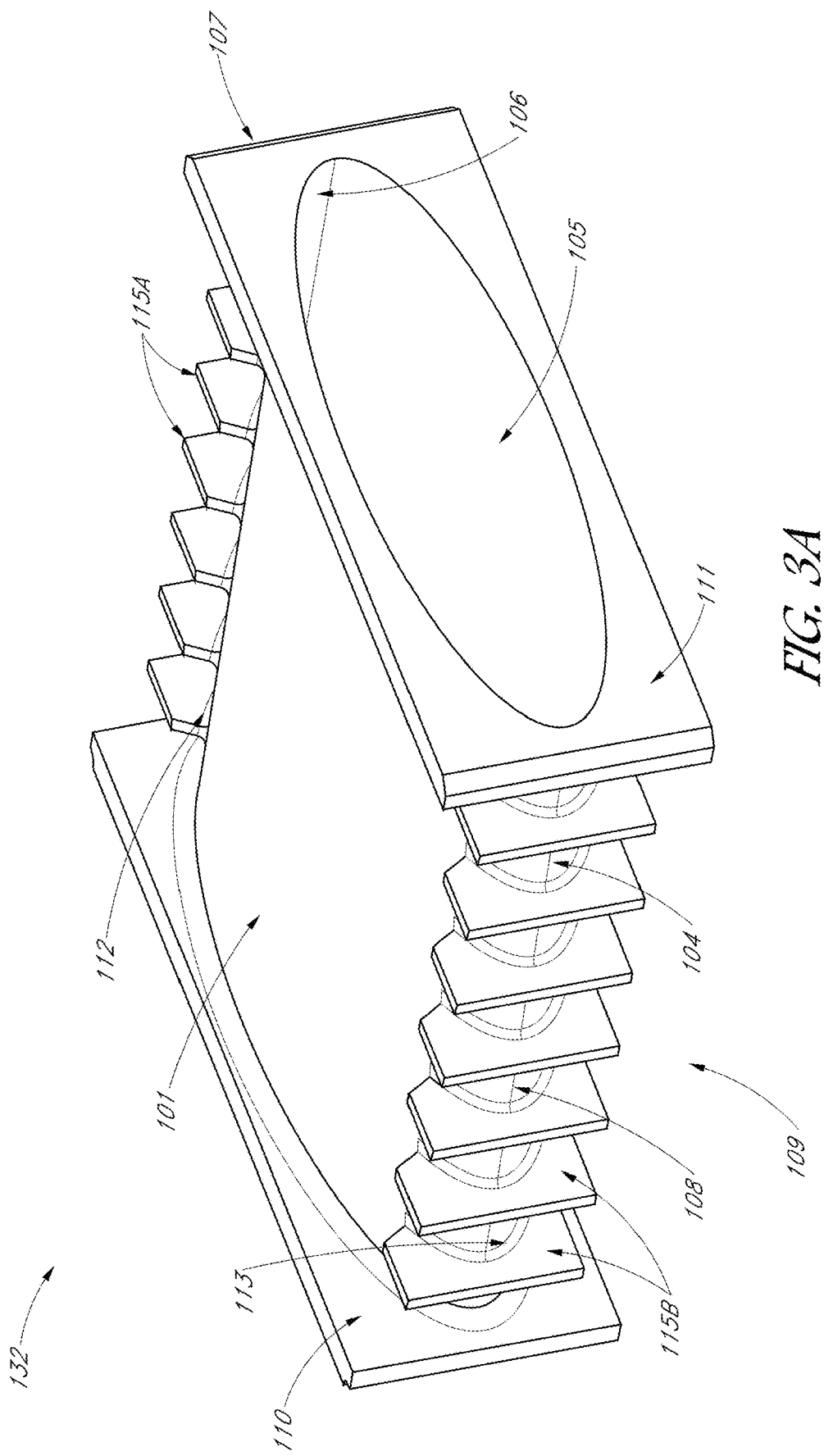
FIG. 3a is a schematic rear perspective view of the curved process chamber of FIG. 2 with rib support structures, according to various embodiments.
Figure 3B:
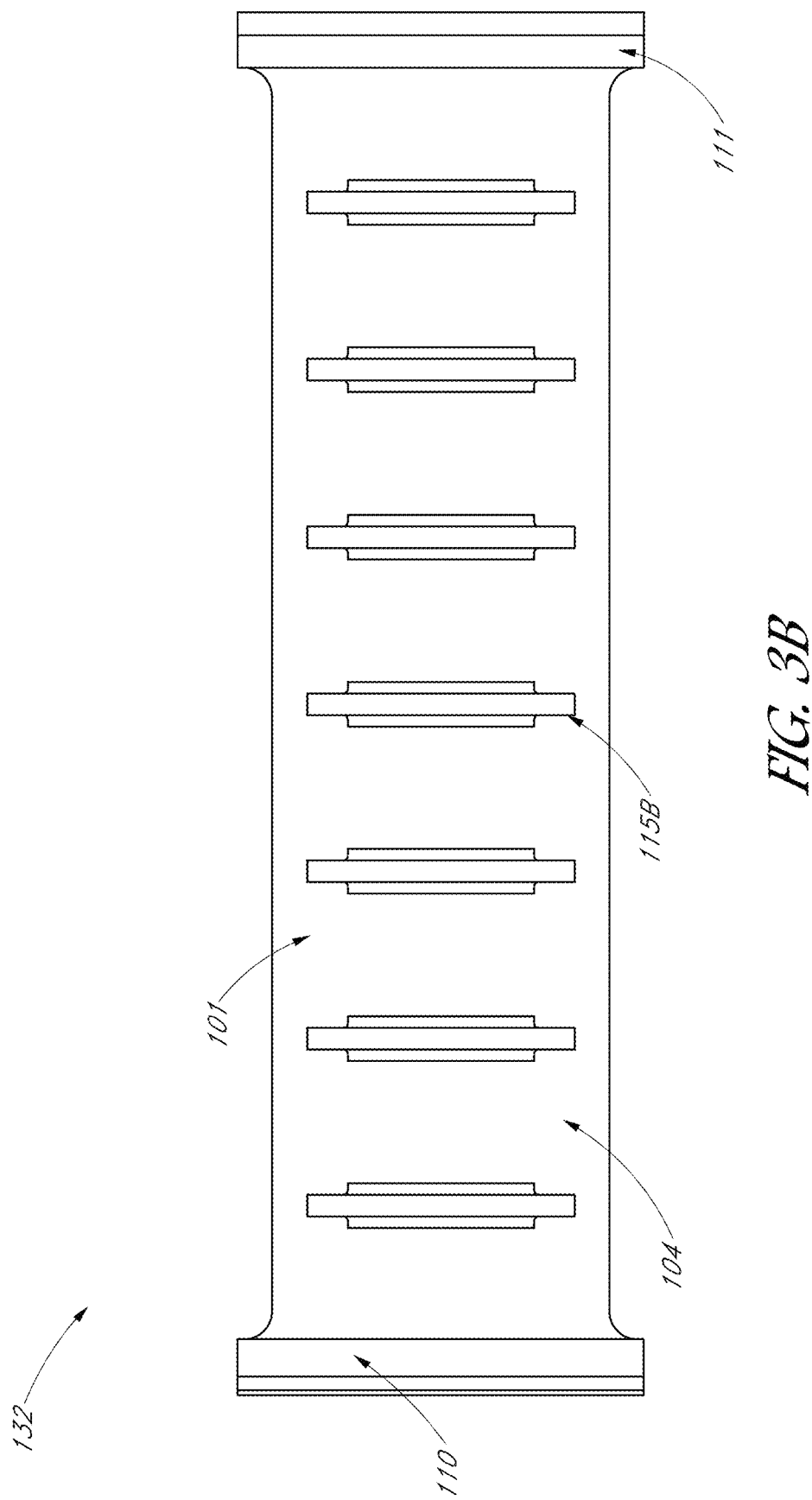
Figure 3C:
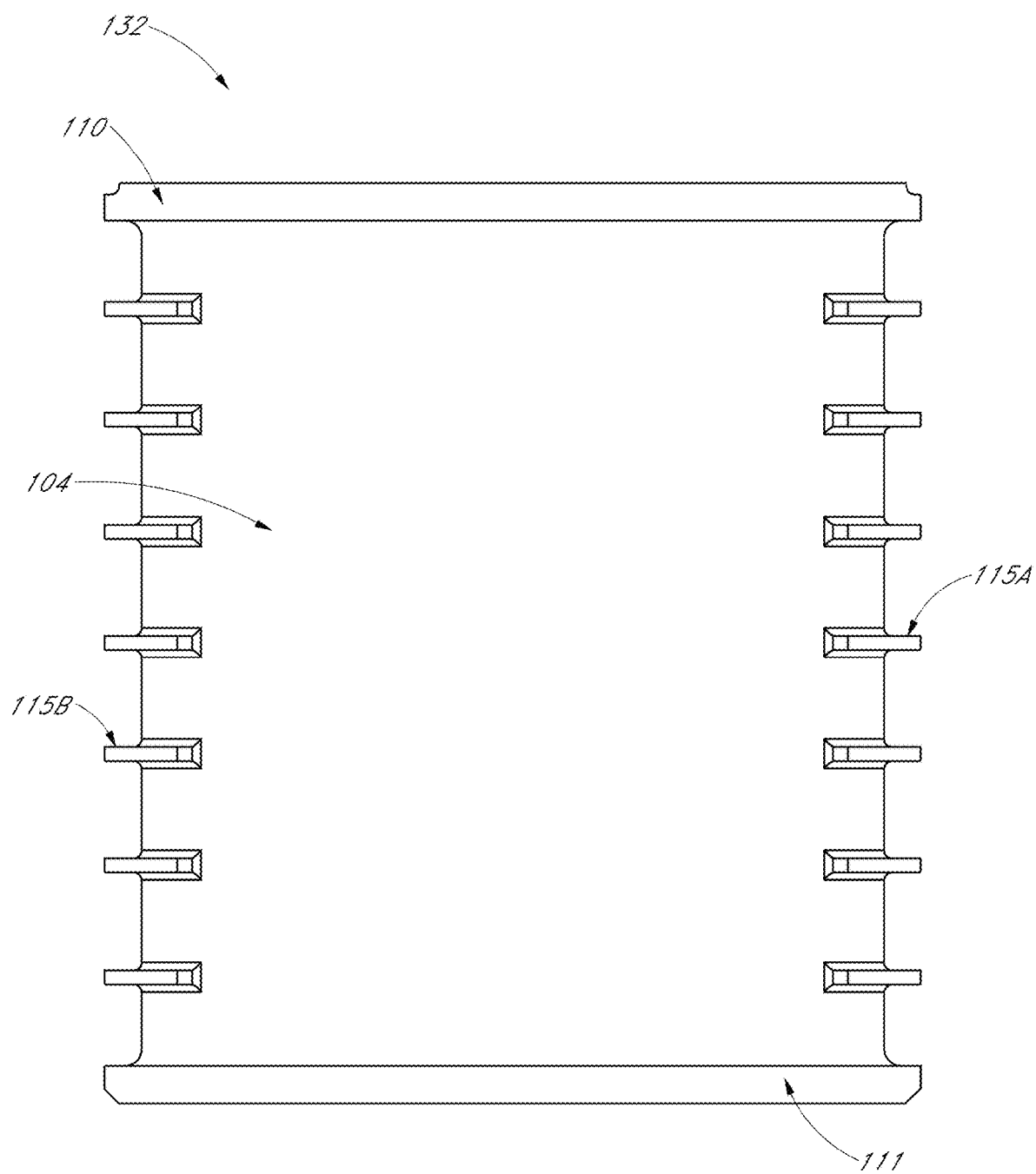
Figure 3D:
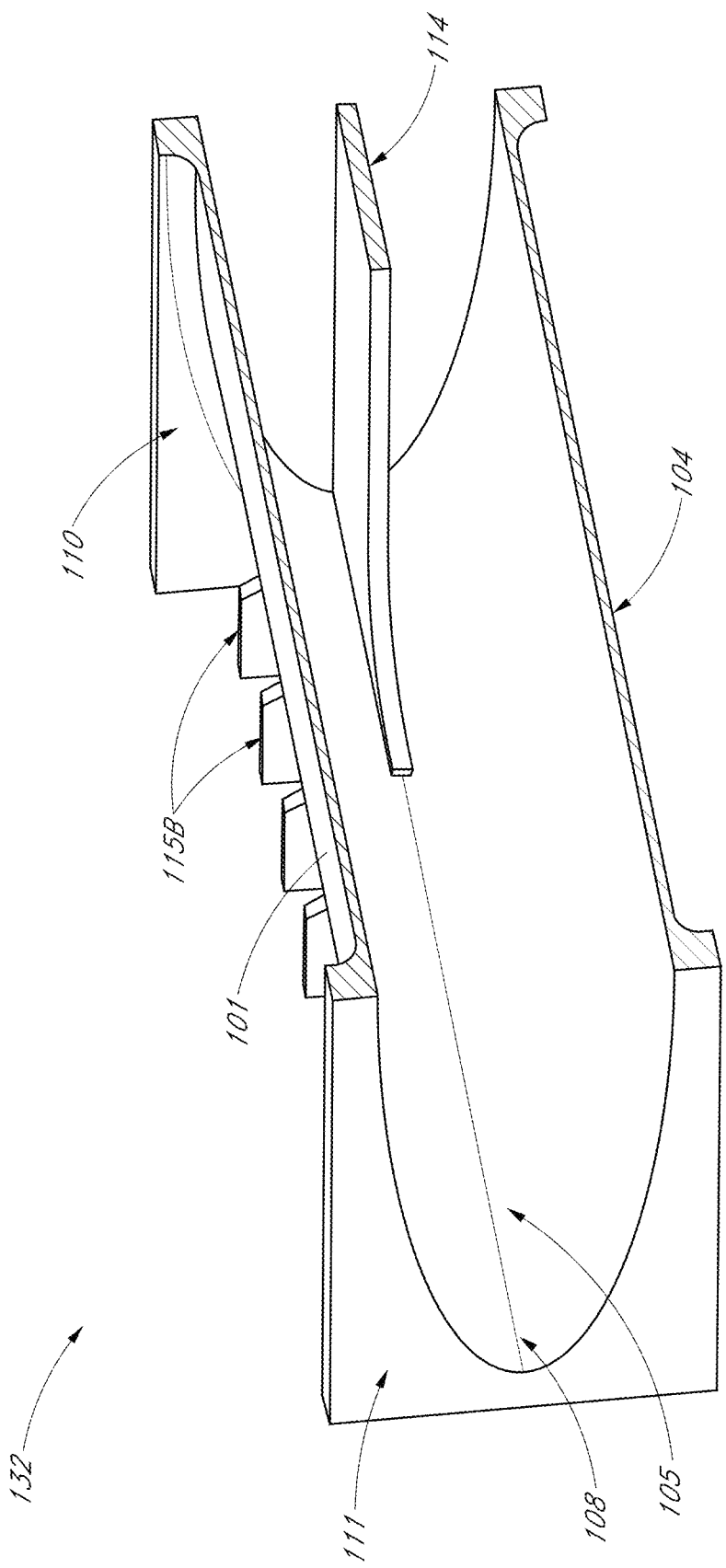
Figure 3E:
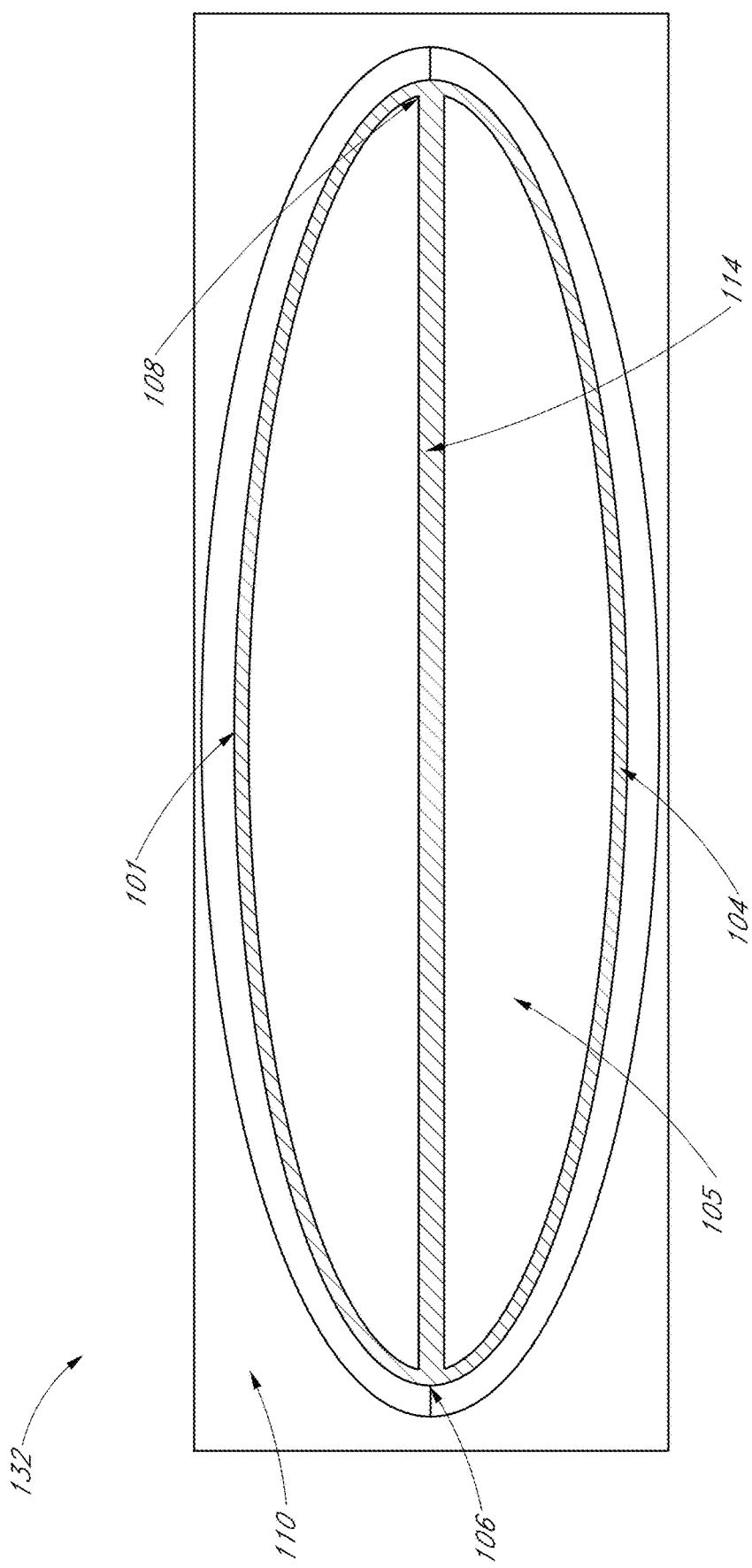

FIG. 3d illustrates a cross sectional view of the process chamber that shows a horizontal shelf 114 disposed in the interior cavity 105 and configured to support a substrate 54, such as a semiconductor wafer. FIG. 3e illustrates a front cross sectional view of the process chamber 132 that shows a section in which the shelf 114 runs all the way across and is joined at the first and second connections or interfaces 106, 108 between the curved upper wall 101 and the curved lower wall 104. In FIG. 3d, the shelf 114 is shown as including a first portion at the rear second end portion 103 of the reaction chamber 132, however it should be appreciated that the shelf 114 can include a second portion at the front first end portion 102 of the reaction chamber 132. Thus, in some embodiments, the first and second portions of the horizontal shelf 114 can be positioned as mirror images of one another such that the wafer enters at a central portion of the chamber 132. In various embodiments, the shelf 114 can be symmetric relative to the reaction chamber 132, e.g., symmetric relative to a longitudinal axis of the reaction chamber 132.

Figure 4A:
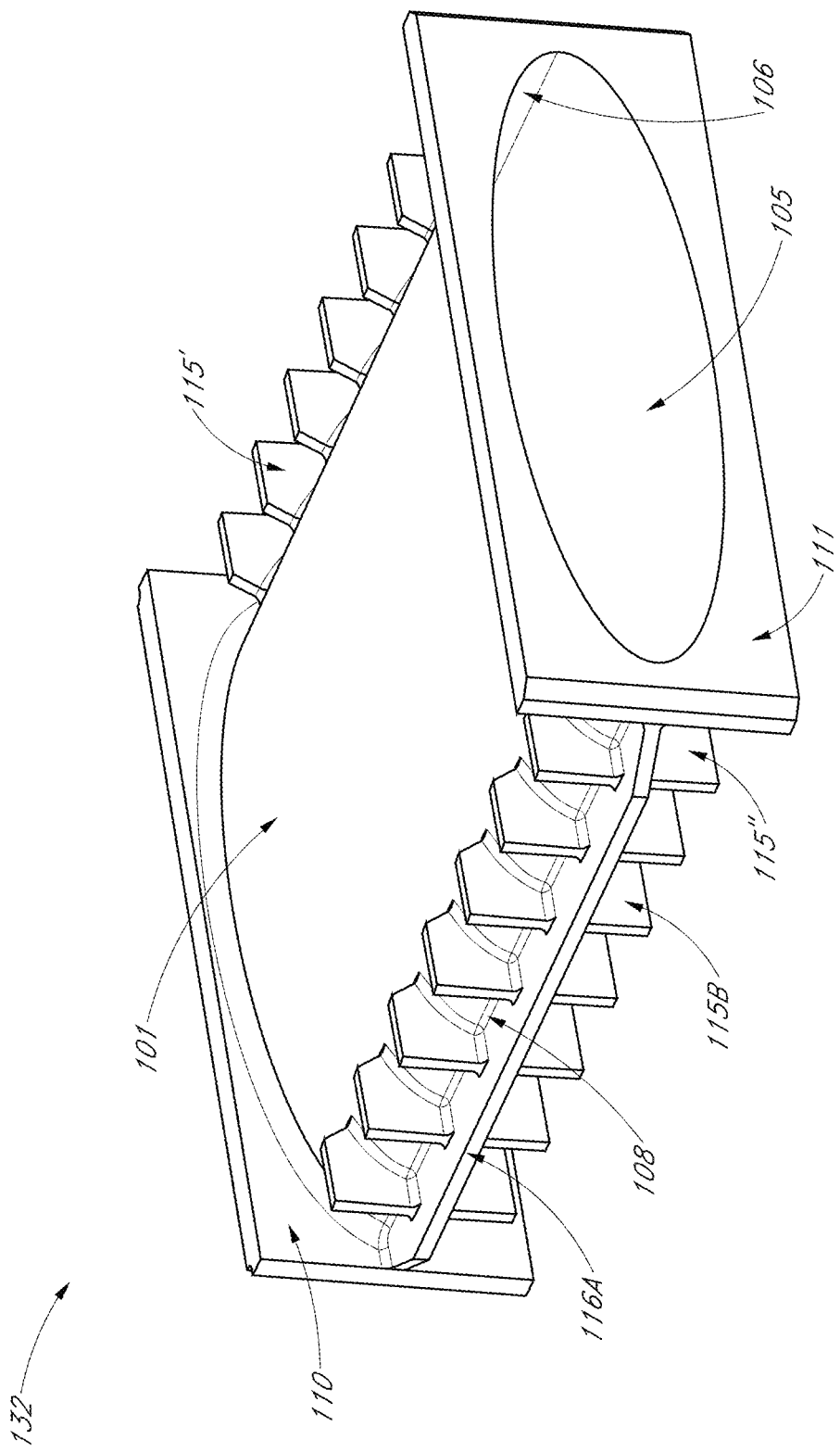
FIG. 4a is a schematic rear perspective view of the curved process chamber of FIGS. 3a-3e with rails and ribs on opposing sides of the chamber, according to various embodiments.
Figure 4B:
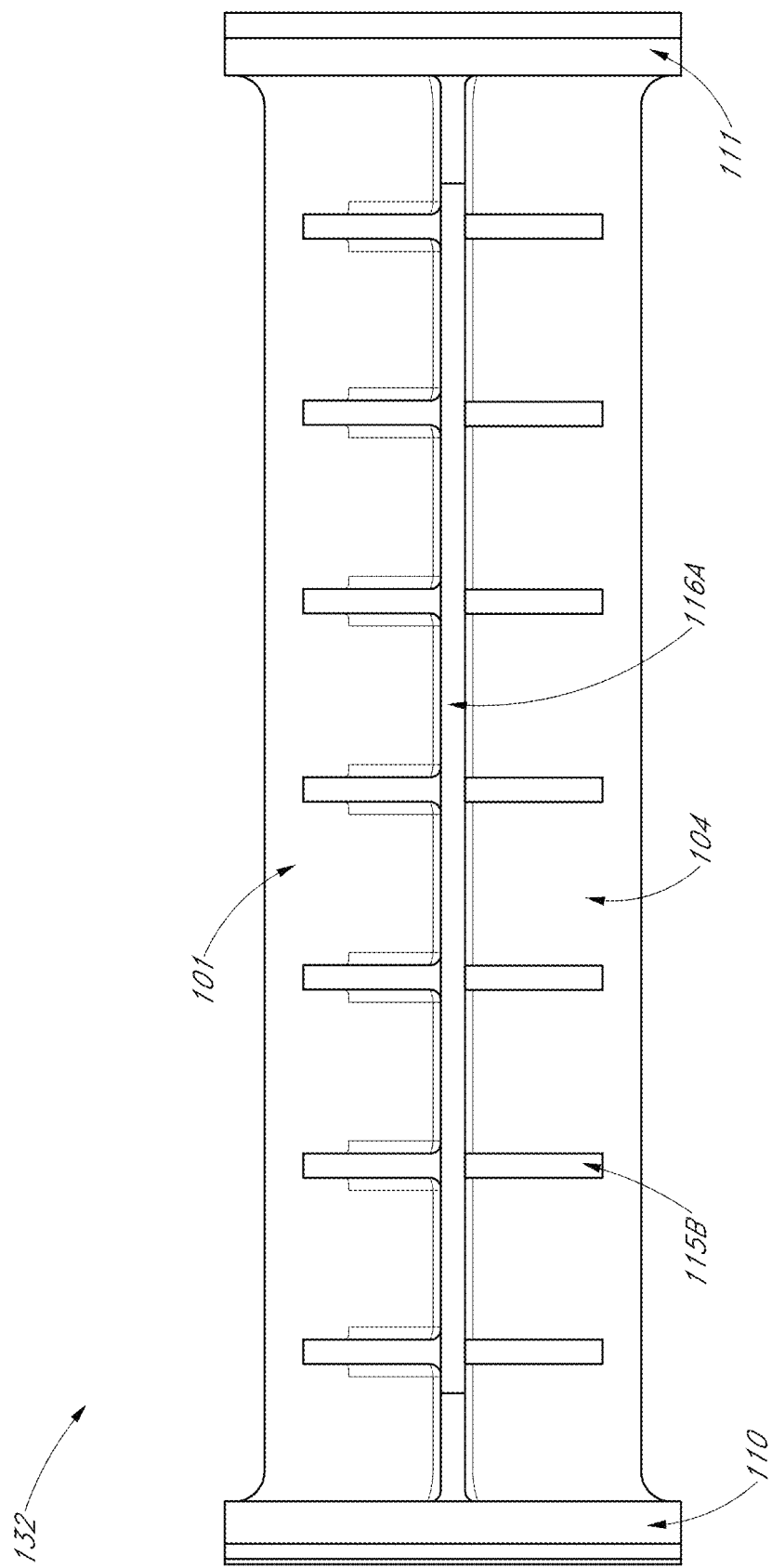

FIGS. 4a-4c illustrates various views of the curved process chamber of FIG. 2 with the rib support structures attached to a rail 116 that runs along the connection or interfaces 106, 108 between the upper and lower walls 101, 104. The embodiment of FIGS. 4a-4c shares many features of the embodiment of FIGS. 2 and 3, and the features of FIGS. 4a-4c are not described again here. The rail 116 can be attached to the plurality of the rib support structures 115A, 115B and can extend along and be mechanically secured to at least one of the first interface 106 and the second interface 108. The rail 116 can be directly connected to at least one of the curved upper wall 101, the curved lower wall 104, and the connector between the upper and lower walls 101, 104. In some embodiments, the rail 116 can be welded to at least one of the curved upper wall 101, the curved lower wall 104, or the connector. The plurality of rib support structures 115A, 115B can comprise a top plurality of rib support structures 115' located on the top of the elongate rail 116 and a bottom plurality of rib support structures 115" located on the bottom of the rail 116. In some embodiments, the connector or an opposing connector along the interfaces 106, 108 can have an accompanying rail 116 connected to its own plurality of rib support structures. In some embodiments, on one side of the reaction chamber 132, the connector can have a plurality of rib support structures 115A or 115B without a rail that is directly connected at least one of the curved upper wall 101 and the curved lower wall 104, but the other side can have a rail 116 connected to a plurality of rib support structures 115A or 115B.

In some embodiments, a first rail 116A can extend along and can be mechanically secured on an exterior surface of the reaction chamber 132 outside the interior cavity 105 near the connection or interface 106 between the upper and lower walls 101, 104. The first curved top portion 115' of each first rib support structure 115A can be disposed above the first rail 116, and the first curved bottom portion 115" of each first rib support structure 115A can be disposed below the first rail 116A. The first curved top portion 115' and the first curved bottom portion 115" can be integrally formed together in some embodiments. The first curved top portion 115' can comprise a curved surface shaped to conform to the exterior surface of the curved upper wall 101, and the first curved bottom portion 115" can comprise a curved surface shaped to conform to the exterior surface of the curved lower wall 104. The first curved top portion 115' and the first curved bottom portion 115" can cooperate to define a generally C-shaped profile. The rails and rib structures can be disposed on opposite sides of the reaction chamber 132 as shown herein.

Figure 5A:
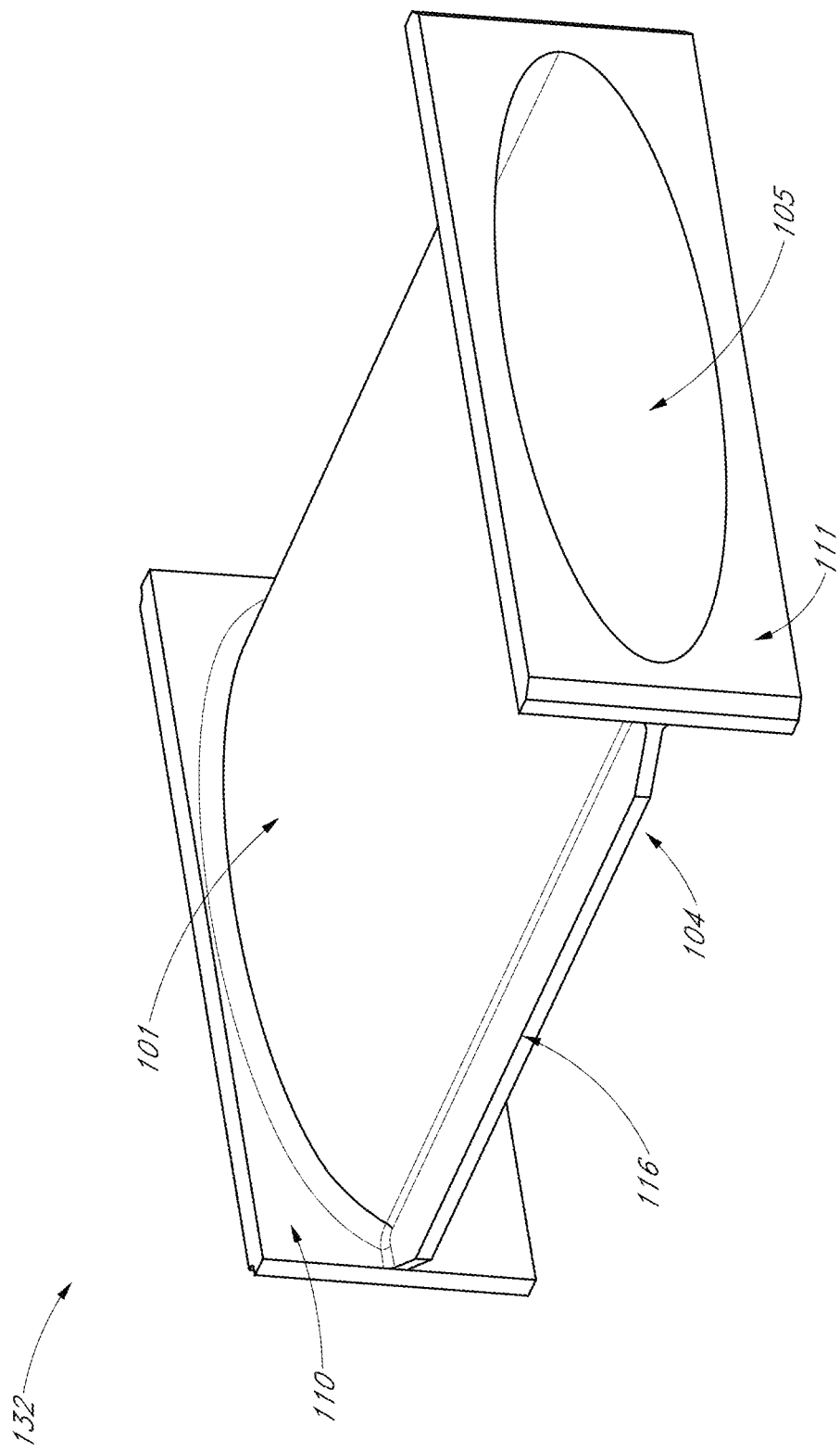
FIG. 5a is a schematic rear perspective view of a curved process chamber of FIGS. 3a-3e and 4a-4c with rails on opposing sides of the chamber, according to various embodiments.
Figure 5B:
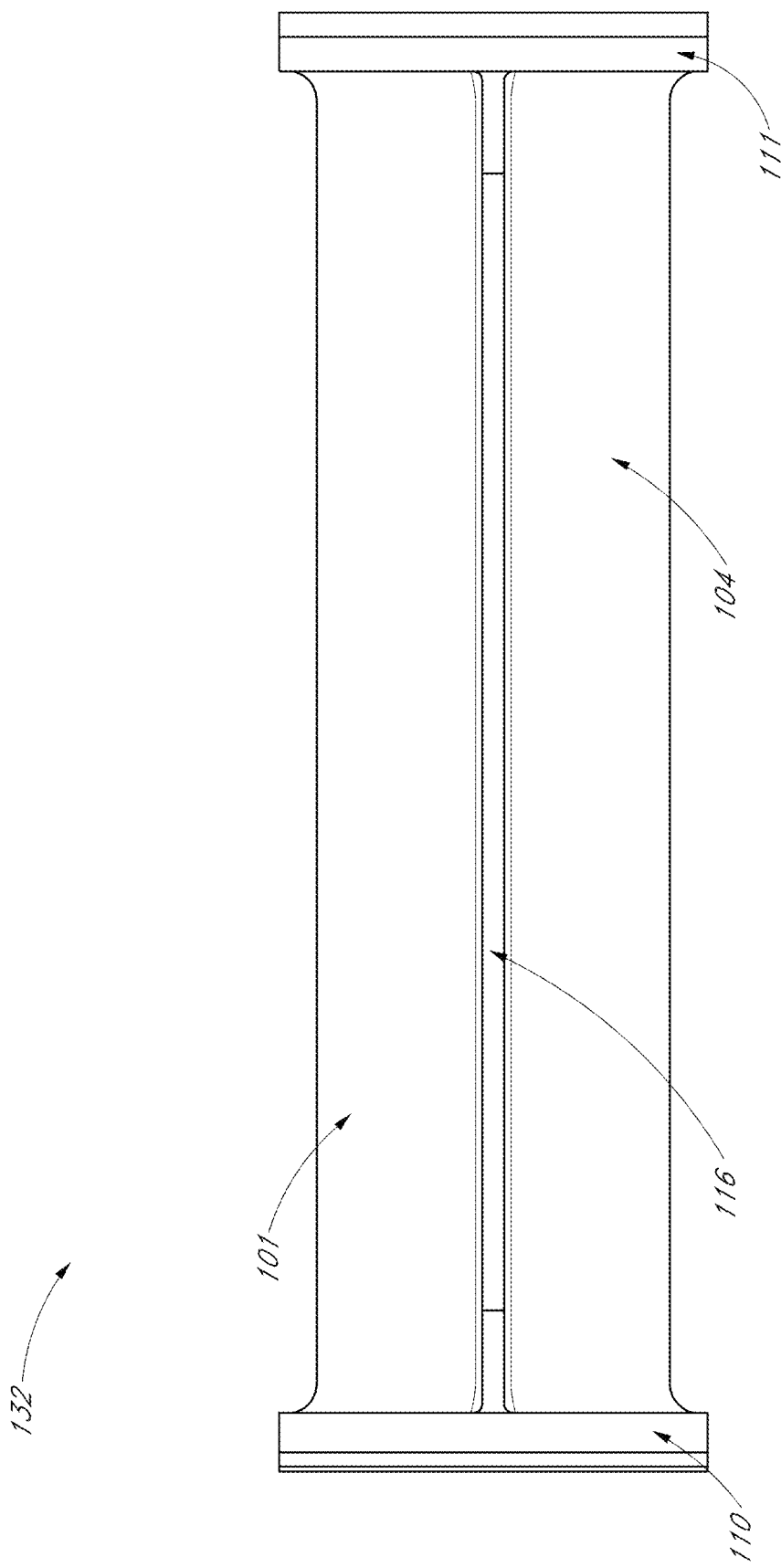

FIGS. 5a-5c illustrate various views of one example of a curved process chamber 132 without rib support structures but with rails 116 to illustrate the placement of the rails 116 with respect to the curved upper wall 101 and the curved lower wall 104. Thus, in some arrangements, a curved process chamber 132 may include rails on opposing sides of the process chamber 132 without ribs.

Figure 6A:
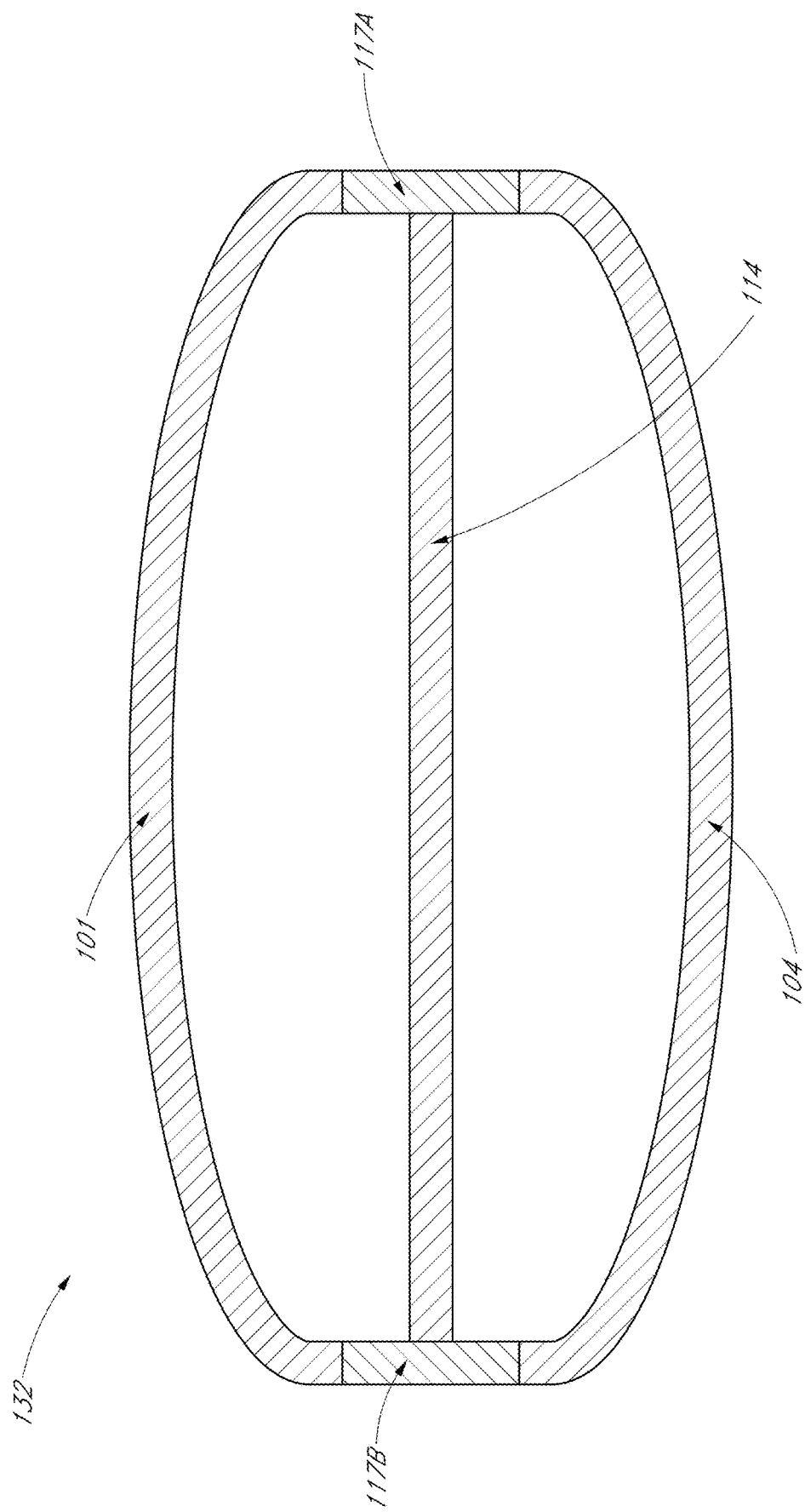
FIG. 6a is a schematic end view of a curved process chamber having vertical sidewalls, according to one embodiment.
Figure 6B:
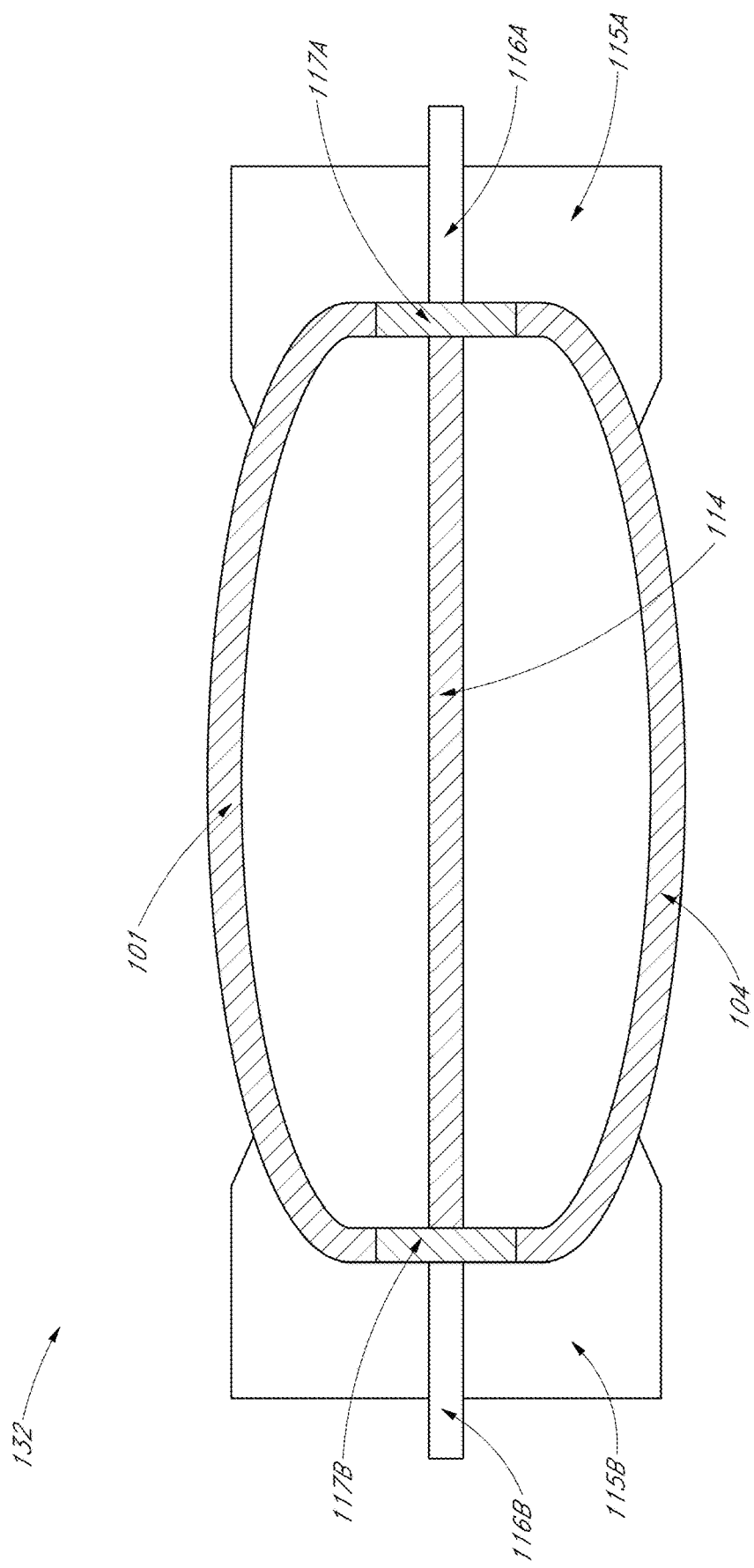
FIG. 6b is a schematic end view of a curved process chamber having vertical sidewalls, ribs, and rails, according to various embodiments.

FIGS. 6a and 6b illustrate cross sectional views of examples of curved process chambers 132 which include vertical sidewalls 117A, 117B. FIGS. 6a and 6b share the structural features of FIG. 3e and these features will not be repeated. However, the example curved process chambers 132 of FIGS. 6a and 6b also include vertical sidewalls 117A, 117B which are substantially flat at the end portions of the curved upper wall 102 and the curved lower wall 104. The two end sections of the shelf 114 can connect to a side surface of the vertical sidewalls 117A, 117B as shown. The shelf 114 may connect to the vertical sidewalls at a middle or central portion of the vertical sidewalls 117A, 117B or a section of the vertical sidewalls 117A, 117B that is not in the middle or central portion.

The curved process chambers 132 of FIGS. 6a and 6b may connect at a joint or connector which comprises the vertical sidewalls 17A, 17B. The vertical sidewalls 17A, 17B may extend linearly between the curved upper wall 101 and the curved lower wall 104. The vertical sidewalls 17A, 17B can be welded to the ends of the curved upper wall 101 and curved lower wall 104. The curved process chamber 132 of FIG. 6a illustrates an implementation that does not include side rib structures or a rail. In some embodiments, the curved process chamber 132 may include one or more side rib structures 115A, 115B as illustrated by FIG. 6b. These side rib structures 115A, 115B may be held together by or connected to one or more rails 116A, 116B as illustrated by FIG. 6b. In some embodiments, the rail may be omitted as shown in the process chamber illustrated in FIGS. 3a-3e.

Figure 7A:
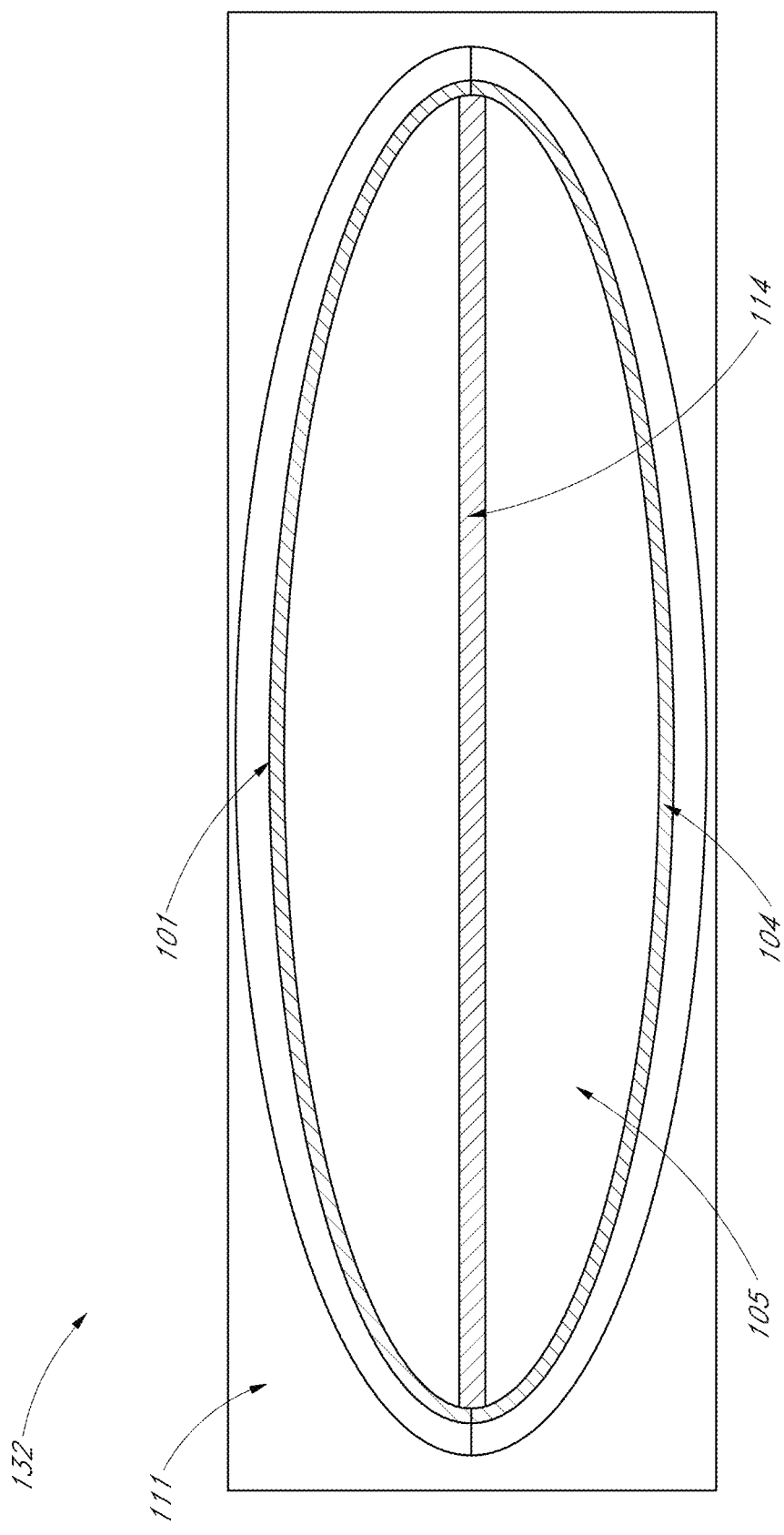
FIG. 7a is a schematic end view of a curved process chamber in which a curved upper wall and a curved lower wall meet at a joint to form a C-shaped profile.
Figure 7B:
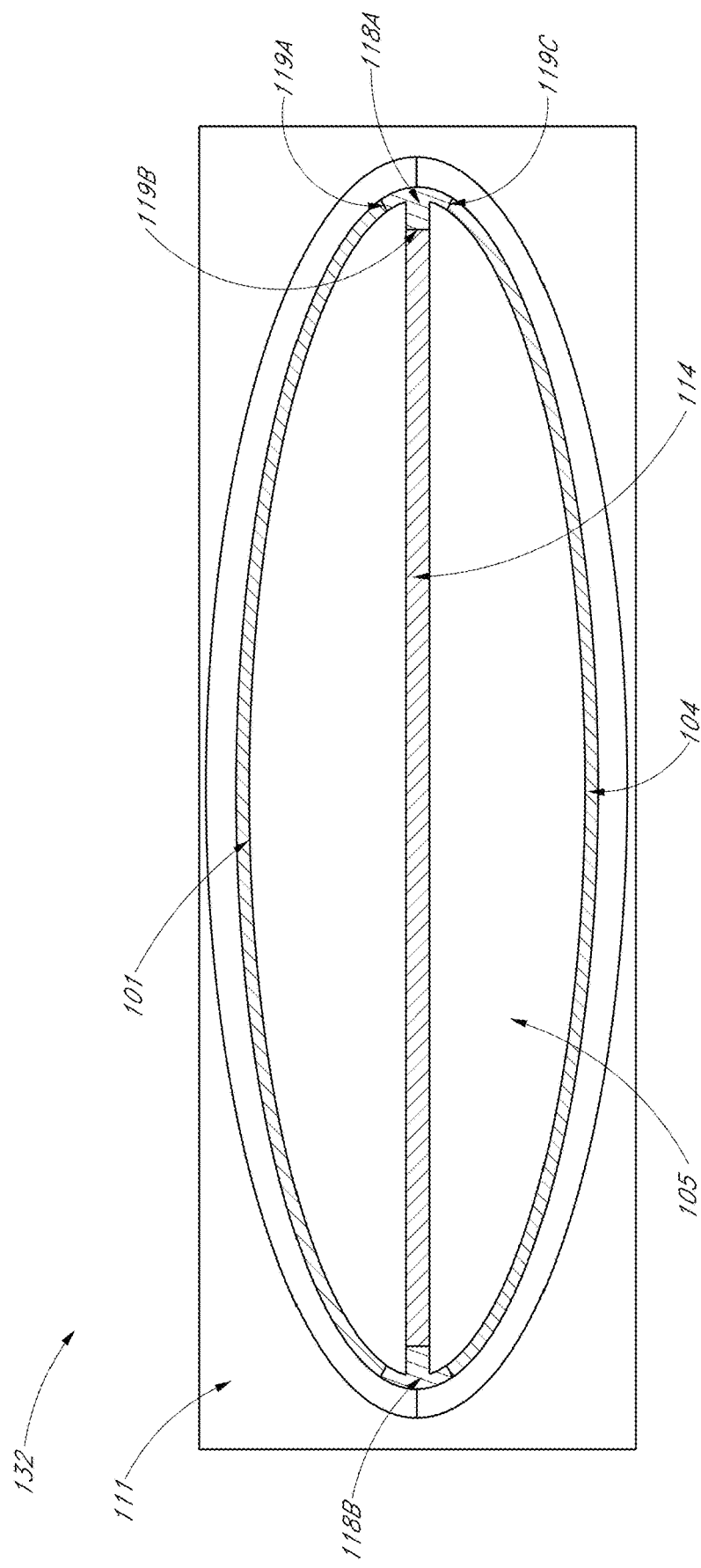
FIG. 7b is a schematic end view of a curved process chamber in which a curved upper wall and a curved lower wall connect by way of a joint comprising an E-shaped connector.

FIGS. 7a and 7b illustrate cross sectional views of multiple examples of curved process chambers 132. These examples can be implemented in all the examples discussed above. In FIG. 7a, the curved process chamber 132 includes a separate shelf 114 and a separate curved upper wall 101 and curved lower wall 104. The curved upper wall 101 and curved lower wall 104 can be welded together to form the internal cavity 105. The curved upper wall 101 and curved lower wall 104 meet to form a C-shaped profile. The shelf 114 can be welded to the curved upper wall 101 and curved lower wall 104 where the curved upper wall 101 and the curved lower wall 104 meet.

FIG. 7b illustrates a curved process chamber 132 including a shelf 114, a curved upper wall 101, a curved lower wall 104, and an E-shaped connector 118A, 118B disposed between and connecting the upper and lower walls 101, 104. The curved upper wall 101 can accordingly connect to the curved lower wall 104 through the E-shaped connectors 118A, 118B. The E-shaped connectors 118A, 118B can connect to the ends of the walls 101, 104 in any suitable way, e.g., by way of a weld. The E-shaped connectors 118A, 118B can also connect to the shelf 114, for example, by a weld.

In some embodiments, the curved upper wall 101 extends longitudinally from a first end portion 102 of the reactor chamber 132 to a second end portion 103 of the reaction chamber 132. The curved lower wall 104 can cooperate with the curved upper wall 101 to at least partially define the internal cavity 105. An upper end of the curved lower wall 101 can be connected by way of a joint (e.g., by way of a direct joint or weld, or by way of an intervening connector) to a lower end of the curved upper wall 101 from the first end portion 102 to the second end portion 103 at the first side 107 of the reaction chamber 132 and at a second side 109 of the reaction chamber 132. A first maximum thickness of the joint can be within 20% of a second maximum thickness of at least one of the lower end of the curved upper wall 101 and the upper end of the curved lower wall 104. In various embodiments, the first maximum thickness of the joint can be within 10% or within 5% of a second maximum thickness of at least one of the lower end of the curved upper wall 101 and the upper end of the curved lower wall 104.

In some embodiments, the joint includes an E-shaped connector 118A, 118B welded to the curved upper and lower walls 101, 104. In some embodiments, the E-shaped connector 118A, 118B or joint includes a linear or curvilinear base with three mechanical connection points that extend from a first end, a second end, and an interior portion of the base. The E-shaped connectors 118A, 118B can comprise a top portion, a bottom portion, and an intermediate portion between the top and bottom portions. For example, as shown in the E-shaped connectors 118A, 118B of FIG. 7b, a first connection point 119A of the connectors 118A, 118B can connect (e.g., be welded to) the lower end of the upper wall 101. A second connection point 119B can connect (e.g., be welded to) a lateral side edge of the shelf 114. A third connection point 119C can connect (e.g., be welded to) an upper end of the lower wall 104. In other embodiments, the joint includes a welded connection between the curved upper wall and the curved lower wall, such that there may be no separate intervening connector therebetween. The first maximum thickness of the joint (e.g., a maximum thickness of the E-shaped connector 118A, 118B, or other connector, or a maximum thickness of a direct welded joint) may be substantially the same as the second maximum thickness of the end portions of the upper or lower walls 101, 104. In some embodiments, the joint includes a vertical sidewall 117A, 117B extending linearly between the upper end and the lower end of the walls 101, 104, the vertical sidewall can be welded to the upper and lower ends. In some embodiments, a first plurality of first rib support structures 115A, 115B may be disposed along only a portion of the curved upper wall 101 and along only a portion of the curved lower wall 104 at or near the joint.

In the embodiments described above, apparatus, systems, and methods for reinforcing a curved process chamber with side ribs are described in connection with particular embodiments. It will be understood, however, that the principles and advantages of the embodiments can be used for any other systems, apparatus, or methods.

Although the foregoing has been described in detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention. Moreover, not all of the features, aspects and advantages described herein above are necessarily required to practice the present invention.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined by reference to the claims.

What is claimed is:

1. A process chamber comprising:
   a curved upper wall extending longitudinally from a first end portion of the process chamber to a second end portion of the process chamber;
   a curved lower wall cooperating with the curved upper wall to at least partially define an internal cavity, wherein the curved lower wall is connected to the curved upper wall from the first end portion to the second end portion at a first side of the process chamber and at a second side of the process chamber;
   a first rib support structure disposed on the first side of the process chamber, the first rib support structure having a first curved top portion secured to a curved exterior surface of the curved upper wall; and
   a second rib support structure disposed on the second side of the process chamber opposite the first rib support structure, the second rib support structure having a second curved top portion secured to the curved exterior surface of the curved upper wall,
   wherein no rib support structures are disposed along the curved exterior surface of the curved upper wall extending directly between the first and the second rib support structures.

2. The process chamber of claim 1, wherein the curved lower wall is mechanically connected to the curved upper wall by way of an intervening connector, wherein the intervening connector is an E-shaped connector.

3. The process chamber of claim 1, further comprising:
   a plurality of first rib support structures disposed on the first side of the process chamber and spaced apart longitudinally from one another, each first rib support structure of the plurality of first rib support structures having a first curved top portion secured to the curved exterior surface of the curved upper wall, and a first curved bottom portion secured to the curved exterior surface of the curved lower wall; and
   a plurality of second rib support structures disposed on the second side of the process chamber and spaced apart longitudinally from one another, each second rib support structure of the plurality of second rib support structures having a second curved top portion secured to the curved exterior surface of the curved upper wall and a second curved bottom portion secured to the curved exterior surface of the curved lower wall,
   wherein each of the plurality of first rib support structures is disposed opposite a respective one of the plurality of second rib support structures, and
   wherein no rib support structures are disposed along the curved exterior surface of the curved upper wall extending directly between any of the plurality of first rib support structures and any of the plurality of second rib support structures.

4. The process chamber of claim 3, further comprising a first rail extending along and mechanically secured to an interface on an exterior surface of the process chamber outside the internal cavity, wherein the first curved top portion of each first rib support structure of the plurality of first rib support structures is disposed above the first rail, and wherein the first curved bottom portion of each first rib support structure of the plurality of first rib support structures is disposed below the first rail.

5. The process chamber of claim 4, wherein the first curved top portion of each first rib support structure of the plurality of first rib support structures is welded to an upper surface of the first rail, and wherein the first curved bottom portion of each first rib support structure of the plurality of first rib support structures is welded to a lower surface of the first rail.

6. The process chamber of claim 1, wherein the first curved top portion comprises a curved surface shaped to conform to the curved exterior surface of the curved upper wall.

7. A process chamber comprising:
   a curved upper wall extending longitudinally from a first end portion of the process chamber to a second end portion of the process chamber; and
   a curved lower wall cooperating with the curved upper wall to at least partially define an internal cavity, the curved lower wall connected to the curved upper wall from the first end portion to the second end portion at a first side of the process chamber and at a second side of the process chamber; and
   a plurality of rib support structures, each disposed along the first side or the second side of the process chamber and directly connected to a portion of the curved upper wall above the internal cavity and to a portion of the curved lower wall below the internal cavity, wherein the plurality of rib support structures do not extend from the first side to the second side along the curved upper wall and along the curved lower wall.

8. The process chamber of claim 7, wherein at least one of the curved upper wall and the curved lower wall comprises a circular, elliptical, or polynomial shape.

9. The process chamber of claim 7, wherein first rib support structures of the plurality of rib support structures are disposed along the first side and second rib support structures of the plurality of rib support structures are disposed along the second side, and a surface of at least one of the curved upper wall and the curved lower wall extending between the first rib support structures and the second rib support structures comprises a substantially uniform thickness.

10. The process chamber of claim 7, wherein the curved upper wall and the curved lower wall are welded together.

11. The process chamber of claim 7, wherein the curved upper wall and the curved lower wall are connected through a connector, wherein the connector is E-shaped and includes a top portion, a bottom portion, and an intermediate portion.

12. The process chamber of claim 7, further comprising a horizontal shelf disposed in the internal cavity and configured to support a substrate within a central portion of the internal cavity, wherein the process chamber lacks any rib support structures along a portion of the curved upper wall extending over all of the central portion.

13. The process chamber of claim 7, wherein the process chamber is made out of quartz.

14. The process chamber of claim 7, wherein the plurality of rib support structures are directly welded onto the curved upper wall and the curved lower wall.

15. The process chamber of claim 7, further comprising a first flange in contact with the curved upper wall at the first end portion and a second flange in contact with the curved lower wall at the second end portion, wherein the first flange is configured to connect with an input manifold and the second flange is configured to connect with an output manifold.

16. The process chamber of claim 7, further comprising at least one rail connected to the plurality of rib support structures.

17. The process chamber of claim 16, wherein the plurality of rib support structures comprises a top plurality of rib support structures located on top of the at least one rail and a bottom plurality of rib support structures located on a bottom of the at least one rail.

18. The process chamber of claim 17, wherein the at least one rail comprises a first rail and a second rail, and wherein the plurality of rib support structures comprises a first plurality of rib support structures connected to the first rail and a second plurality of rib support structures connected to the second rail.

19. The process chamber of claim 7, wherein first rib support structures of the plurality of rib support structures are disposed along the first side and spaced longitudinally from one another along the curved upper wall, wherein second rib support structures of the plurality of rib support structures are disposed along the second side and spaced longitudinally from one another along the curved upper wall, and wherein no rib support structures are disposed over a top portion of the curved upper wall along an entire longitudinal extent spanned by the first rib support structures and by the second rib support structures along the curved upper wall.

20. The process chamber of claim 7, wherein the curved upper wall is directly connected to the curved lower wall.

21. A process chamber comprising:
a curved upper wall extending longitudinally from a first end portion of the process chamber to a second end portion of the process chamber; and
a curved lower wall cooperating with the curved upper wall to at least partially define an internal cavity, an upper end of the curved lower wall connected by way of a joint to a lower end of the curved upper wall from the first end portion to the second end portion at a first side of the process chamber and at a second side of the process chamber;
a first plurality of side ribs disposed along a first portion of the curved upper wall adjacent the first side and above the internal cavity without extending to the second side; and
a second plurality of side ribs disposed along a second portion of the curved upper wall adjacent the second side and above the internal cavity without extending to the first side,
wherein a first maximum thickness of the joint from a side facing the internal cavity to an opposite side facing away from the internal cavity is within 20% of a second maximum thickness of at least one of the lower end of the curved upper wall and the upper end of the curved lower wall.

22. The process chamber of claim 21, wherein the joint comprises a welded connection between the curved upper wall and the curved lower wall.

23. The process chamber of claim 21, wherein the first maximum thickness is substantially the same as the second maximum thickness.

24. The process chamber of claim 21, further comprising a shelf configured to support a wafer positioned within a central portion of the process chamber, wherein no rib support structures are disposed along a portion of the curved upper wall extending over all of the central portion.

25. A process chamber comprising:
a curved upper wall extending longitudinally from a first end portion of the process chamber to a second end portion of the process chamber;
a curved lower wall cooperating with the curved upper wall to at least partially define an internal cavity, the curved lower wall connected to the curved upper wall from the first end portion to the second end portion at a first side of the process chamber and at a second side of the process chamber;
at least one rail extending along an exterior surface of the process chamber from the first end portion to the second end portion, the at least one rail disposed at or near a connection between the curved upper wall and the curved lower wall, wherein the at least one rail is directly connected to at least one of the curved upper wall and the curved lower wall; and
a plurality of side ribs comprising a top plurality of rib support structures located on a top side of the at least one rail and a bottom plurality of rib support structures located on a bottom of side of the at least one rail, the top plurality of rib support structures disposed along a portion of the curved upper wall above the internal cavity without extending completely between the first and the second sides, and the bottom plurality of rib support structures disposed along a portion of the curved lower wall below the internal cavity without extending completely between the first and the second sides.

* * * * *